US012590882B2

(12) United States Patent
Brunette et al.

(10) Patent No.: US 12,590,882 B2
(45) Date of Patent: Mar. 31, 2026

(54) THRESHOLD GATING FOR FLOW CYTOMETRY METHODS

(71) Applicant: Juno Therapeutics, Inc., Seattle, WA (US)

(72) Inventors: Rebecca Brunette, Seattle, WA (US); Ryan P. Larson, Seattle, WA (US); Kevin Hawkins, Seattle, WA (US)

(73) Assignee: Juno Therapeutics, Inc., Seattle, WA (US)

( * ) Notice: Subject to any disclaimer, the term of this patent is extended or adjusted under 35 U.S.C. 154(b) by 172 days.

(21) Appl. No.: 18/267,744

(22) PCT Filed: Dec. 15, 2021

(86) PCT No.: PCT/US2021/063644
§ 371 (c)(1),
(2) Date: Jun. 15, 2023

(87) PCT Pub. No.: WO2022/132985
PCT Pub. Date: Jun. 23, 2022

(65) Prior Publication Data
US 2024/0053250 A1 Feb. 15, 2024

Related U.S. Application Data

(60) Provisional application No. 63/126,509, filed on Dec. 16, 2020.

(51) Int. Cl.
*G01N 15/14* (2024.01)
*G01N 15/10* (2006.01)
*G01N 21/64* (2006.01)

(52) U.S. Cl.
CPC ..... *G01N 15/1427* (2013.01); *G01N 15/1012* (2013.01); *G01N 21/6486* (2013.01);
(Continued)

(58) Field of Classification Search
CPC ... G01N 2015/1006; G01N 2015/1402; G01N 21/6486; G01N 15/1427; G01N 15/1012
See application file for complete search history.

(56) References Cited

U.S. PATENT DOCUMENTS

| 4,284,412 A | 8/1981 | Hansen et al. |
| 4,475,236 A | 10/1984 | Hoffman et al. |
| | (Continued) | |

FOREIGN PATENT DOCUMENTS

| CN | 111458522 | 7/2020 | |
| CN | 114252386 A * | 3/2022 | ......... G01N 21/6486 |
| | (Continued) | | |

OTHER PUBLICATIONS

Bird et al. "Single-Chain Antigen-Binding Proteins," Science (1988) 242: 423-426.

(Continued)

*Primary Examiner* — Maurice C Smith
(74) *Attorney, Agent, or Firm* — MORRISON & FOERSTER LLP

(57) ABSTRACT

Provided are methods for flow cytometry analysis, including the setting and use of static gating thresholds separating positive fluorescence from negative fluorescence for each fluorescence channel in the assay.

40 Claims, 4 Drawing Sheets

(52) U.S. Cl.
CPC ................ *G01N 2015/1014* (2024.01); *G01N 2015/1402* (2013.01); *G01N 2015/1488* (2013.01)

(56) References Cited

U.S. PATENT DOCUMENTS

| | | | |
|---|---|---|---|
| 4,704,891 A | 11/1987 | Recktenwald et al. |
| 4,714,682 A | 12/1987 | Schwartz |
| 4,767,206 A | 8/1988 | Schwartz |
| 4,774,189 A | 9/1988 | Schwartz |
| 5,620,842 A | 4/1997 | Davis et al. |
| 6,008,052 A | 12/1999 | Davis et al. |
| 8,802,374 B2 | 8/2014 | Jensen |
| 2003/0175831 A1 | 9/2003 | Canton et al. |
| 2012/0064097 A1 | 3/2012 | Washburn et al. |
| 2018/0030410 A1 | 2/2018 | Loh et al. |

FOREIGN PATENT DOCUMENTS

| | | | |
|---|---|---|---|
| JP | 2010-156679 | 7/2010 | |
| WO | WO 1991/000509 | 1/1991 | |
| WO | WO 1993/011161 | 6/1993 | |
| WO | WO 1994/013804 | 6/1994 | |
| WO | WO 2002/099381 | 12/2002 | |
| WO | WO 2013/039883 | 3/2013 | |
| WO | WO 2014/031687 | 2/2014 | |
| WO | WO 2014/144826 | 9/2014 | |
| WO | WO-2019049442 A1 * | 3/2019 | ......... G01N 15/1459 |

OTHER PUBLICATIONS

Brown et al., "Controls for flow cytometers in hematology and cellular immunology," Ann N Y Acad Sci. (1986) 468:93-103.
Brown et al., "Two-color multiparametric method for flow cytometric DNA analysis. Standardization of spectral compensation," Am J Clin Pathol. (1994) 101(5):630-7.
Evenson et al., "Individuality of DNA denaturation patterns in human sperm as measured by the sperm chromatin structure assay," Reprod Toxicol. (1991) 5(2):115-25.
Holliger, P. et al. "Diabodies": Small bivalent and bispecific antibody fragments (bacterial expression/phage display/dyad/surface plasmon resonance), Proc. Natl. Acad. Sci. (1993) 90: 6444-6448.
Hu et al., "Minibody: A Novel Engineered Anti-Carcinoembryonic Antigen Antibody Fragment (Single-Chain Fv-CH3) Which Exhibits Rapid, High-Level Targeting of Xenografts," Cancer Res. (1996) 56:3055-3061.
Huston, J.S. et al., "Protein Engineering of Antibody Binding Sites: Recovery of Specific Activity in an Anti-Digoxin Single-Chain Fv Analogue Produced in *Escherichia coli*," Proc. Natl. Acad. Sci. U.S.A. (1988) 85(16)5879-5883.
Liu et al., "Inclusion of Strep-Tag II in design of antigen receptors for T cell immunotherapy," Nat Biotechnol. (2016) 34(4): 430-434.
Reiter et al., "Engineering antibody Fv fragments for cancer detection and therapy: disulfide-stabilized Fv fragments," Nat Biotechnol. (1996) 14(10):1239-45.
Ward et al., "Binding Activities of a Repertoire of Single Immunoglobulin Variable Domains Secreted From *Escherichia coli*," (1989) Nature 341:544-546.
Brown et al., "Controls for flow cytometers in hematology and cellular immunology," Ann N Y Acad Sci. (1986) 468:93-103. Database accession No. EMB 1986223429, 1 page.

* cited by examiner

FIG. 2A

Unstained/Negative Analysis

95th Percentile of Unstained

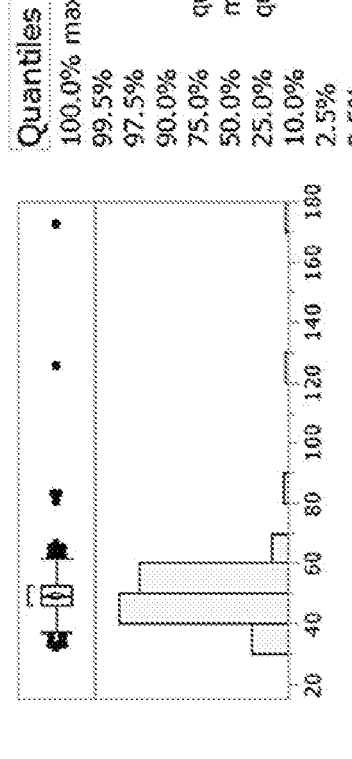

| Quantiles | | |
|---|---|---|
| 100.0% | maximum | 62.9 |
| 99.5% | | 57.3 |
| 97.5% | | 42.4 |
| 90.0% | | 37.2 |
| 75.0% | quartile | 34.7 |
| 50.0% | median | 32.1 |
| 25.0% | quartile | 29.5 |
| 10.0% | | 27.0 |
| 2.5% | | 23.1 |
| 0.5% | | 19.3 |
| 0.0% | minimum | 19.3 |

| Summary Statistics | |
|---|---|
| Mean | 32.5 |
| Std Dev | 5.0 |
| Std Err Mean | 0.3 |
| Upper 95% Mean | 33.0 |
| Lower 95% Mean | 31.9 |
| N | 344.0 |
| CV | 15.5 |
| Median | 32.1 |

Max of the 95th : 62.9

99th Percentile of Unstained

| Quantiles | | |
|---|---|---|
| 100.0% | maximum | 173.0 |
| 99.5% | | 138.9 |
| 97.5% | | 65.5 |
| 90.0% | | 55.6 |
| 75.0% | quartile | 52.6 |
| 50.0% | median | 48.8 |
| 25.0% | quartile | 46.2 |
| 10.0% | | 41.1 |
| 2.5% | | 35.9 |
| 0.5% | | 32.9 |
| 0.0% | minimum | 32.5 |

| Summary Statistics | |
|---|---|
| Mean | 49.7 |
| Std Dev | 10.3 |
| Std Err Mean | 0.6 |
| Upper 95% Mean | 50.8 |
| Lower 95% Mean | 48.6 |
| N | 344.0 |
| CV | 20.8 |
| Median | 48.8 |

Max of the 99th : 173.0

FIG. 2B

Positive Stained Analysis

1st Percentile of Positive

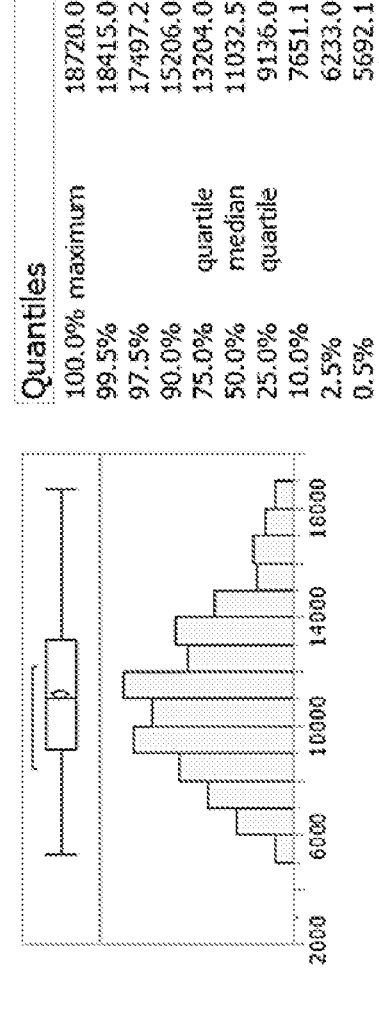

| Quantiles | | |
|---|---|---|
| 100.0% | maximum | 13544.0 |
| 99.5% | | 12221.7 |
| 97.5% | | 11334.1 |
| 90.0% | | 9322.0 |
| 75.0% | quartile | 8134.0 |
| 50.0% | median | 7049.0 |
| 25.0% | quartile | 5964.0 |
| 10.0% | | 4871.3 |
| 2.5% | | 4057.0 |
| 0.5% | | 3661.0 |
| 0.0% | minimum | 3597.0 |

| Summary Statistics | |
|---|---|
| Mean | 7147.1 |
| Std Dev | 1725.9 |
| Std Err Mean | 53.7 |
| Upper 95% Mean | 7252.5 |
| Lower 95% Mean | 7041.7 |
| N | 1032.0 |
| CV | 24.1 |
| Median | 7049.0 |

Min of the 1st : 3597.0

5th Percentile of Positive

| Quantiles | | |
|---|---|---|
| 100.0% | maximum | 18720.0 |
| 99.5% | | 18415.0 |
| 97.5% | | 17497.2 |
| 90.0% | | 15206.0 |
| 75.0% | quartile | 13204.0 |
| 50.0% | median | 11032.5 |
| 25.0% | quartile | 9136.0 |
| 10.0% | | 7651.1 |
| 2.5% | | 6233.0 |
| 0.5% | | 5692.1 |
| 0.0% | minimum | 5324.0 |

| Summary Statistics | |
|---|---|
| Mean | 11213.5 |
| Std Dev | 2863.2 |
| Std Err Mean | 89.1 |
| Upper 95% Mean | 11388.4 |
| Lower 95% Mean | 11038.6 |
| N | 1032.0 |
| CV | 25.5 |
| Median | 11032.5 |

Min of the 5th : 5324.0

THRESHOLD GATING FOR FLOW CYTOMETRY METHODS

CROSS-REFERENCE TO RELATED APPLICATIONS

This application is a national stage application under 35 U.S.C. § 371 of International Application No. PCT/US2021/063644 filed internationally on Dec. 15, 2021, which claims priority from U.S. Provisional Application No. 63/126,509 filed Dec. 16, 2020, entitled "THRESHOLD GATING FOR FLOW CYTOMETRY METHOD," the contents of each of which are incorporated by reference in their entirety.

FIELD

The present disclosure relates in some aspects to flow cytometry analysis, including the setting and use of static gating thresholds separating positive fluorescence from negative fluorescence for each fluorescence channel in the assay.

BACKGROUND

Fluorescence Minus One (FMO) or isotype gating controls for each fluorochrome-conjugated antibody are industry standard gating controls for flow cytometry methods used in Quality Control (QC) settings. Although a benefit to these gating approaches is that they allow for objective gate placement, there are also disadvantages to these approaches, including decreased throughput, increased assay complexity (e.g., due to time limitations, failure rates, and sample volume limitations), and increased cost of goods. Improved gating approaches are needed. Provided are embodiments that meet such needs.

SUMMARY

Provided herein is a method of determining a static fluorescence threshold gate, the method comprising: (1) measuring cytometry events by flow cytometry for one or more fluorescent signals for a plurality of at least two reference cell samples, the plurality of the at least two reference cell samples comprising: (a) a plurality of a first reference cell sample each comprising a population of unstained cells that have not been labeled with the one or more fluorescent signals; and (b) a plurality of a second reference cell sample, wherein each of the plurality of the second reference cell sample is derived from the same source type of cells as one of the plurality of the first reference cell sample, and wherein each of the plurality of the second reference cell sample comprises at least one population of stained cells that have been labeled with at least one of the one or more fluorescent signals; and (2) setting a static fluorescence threshold gate for each of the one or more fluorescent signals, such that for each fluorescent signal the threshold gate is a fluorescence that: (a) is greater than the $90^{th}$ percentile of fluorescence of the plurality of the first reference cell sample for the respective fluorescent signal of each of the one or more fluorescent signals; and (b) is less than the $10^{th}$ percentile of fluorescence of the plurality of the second reference cell sample for the same respective fluorescent signal.

Also provided herein is a method of selecting a subset of cytometry events from flow cytometry data, the method comprising: (1) receiving flow cytometry data comprising a plurality of cytometry events from a test cell sample comprising labeled cells sorted according to one or more fluorescent signals measured by a flow cytometer; (2) applying a static fluorescence threshold gate individually to each of the one or more fluorescent signals, wherein the static fluorescence threshold gate for each of the one or more fluorescent signals is determined according to the method of claim 1; and (3) for each of the one or more fluorescent signals, identifying a subset of cells from the test sample that have a fluorescence signal above the static threshold gate.

Also provided herein is method of selecting a subset of cytometry events from flow cytometry data, comprising: (1) receiving flow cytometry data comprising a plurality of cytometry events from a test cell sample comprising labeled cells sorted according to one or more fluorescent signals measured by a flow cytometer; (2) applying a static fluorescence threshold gate individually to each of the one or more fluorescent signals, wherein the static fluorescence threshold gate for each of the one or more fluorescent signals is determined from: (a) cytometry events measured by flow cytometry for the one or more fluorescent signals for a plurality of at least two reference cell samples each sorted according to the one or more fluorescent signals, the plurality of the at least two reference cell samples comprising: (i) a plurality of a first reference cell sample each comprising a population of unstained cells that have not been labeled with the one or more fluorescent signals; and (ii) a plurality of a second reference cell sample, wherein each of the plurality of the second reference cell sample is derived from the same source type of cells as one of the plurality of the first reference cell sample, and wherein each of the plurality of the second reference cell sample comprises at least one population of stained cells that have been labeled with at least one of the one or more fluorescent signals; and (b) setting a static fluorescence threshold gate for each of the one or more fluorescent signals such that for each fluorescent signal the threshold gate is a fluorescence that: (i) is greater than the $90^{th}$ percentile of fluorescence of the plurality of the first reference cell sample for the respective fluorescent signal of each of the one or more fluorescent signals; and (ii) is less than the $10^{th}$ percentile of fluorescence of the plurality of the second reference cell sample for the same respective fluorescent signal; and (3) for each of the one or more fluorescent signals, identifying a subset of cells from the test sample that have a fluorescence signal above the static threshold gate.

Also provided herein is a method of applying a static fluorescence threshold gate using flow cytometry, comprising: (1) receiving flow cytometry data comprising a plurality of cytometry events from a test cell sample comprising labeled cells sorted according to one or more fluorescent signals measured by a flow cytometer; and (2) applying a static fluorescence threshold gate individually to each of the one or more fluorescent signals, wherein the static fluorescence threshold gate for each of the one or more fluorescent signals is determined according to any method of determining a static fluorescence threshold gate disclosed herein.

Also provided herein is a method of applying a static fluorescence threshold gate using flow cytometry, comprising: (1) receiving flow cytometry data comprising a plurality of cytometry events from a test cell sample comprising labeled cells sorted according to one or more fluorescent signals measured by a flow cytometer; (2) applying a static fluorescence threshold gate individually to each of the one or more fluorescent signals, wherein the static fluorescence threshold gate for each of the one or more fluorescent signals is determined from: (a) cytometry events measured by flow cytometry for the one or more fluorescent signals for a plurality of at least two reference cell samples each sorted according to the one or more fluorescent signals, the plurality of the at least two reference cell samples comprising: (i) a plurality of a first reference cell sample each comprising a population of unstained cells that have not been labeled with the one or more fluorescent signals; and (ii) a plurality of a second reference cell sample, wherein each of the plurality of the second reference cell sample is derived from the same source type of cells as one of the plurality of the first reference cell sample, and wherein each of the plurality of the second reference cell sample comprises at least one population of stained cells that have been labeled with at least one of the one or more fluorescent signals; and (b) setting a static fluorescence threshold gate for each of the one or more fluorescent signals, such that for each fluorescent signal the threshold gate is a fluorescence that: (i) is greater than the $90^{th}$ percentile of fluorescence of the plurality of the first reference cell sample for the respective fluorescent signal of each of the one or more fluorescent signals; and (ii) is less than the $10^{th}$ percentile of fluorescence of the plurality of the second reference cell sample for the same respective fluorescent signal.

In some of any such embodiments, the test cell sample, and each of the plurality of the first and second reference cell sample, are from the same source type of cells. In some of any such embodiments, the source type of cells is a cell line. In some of any such embodiments, the source type of cells is a primary cell population from a subject. In some of any such embodiments, the source type of cells of each of the test cell sample, and each of the plurality of the first and second reference cell sample, are from a different subject. In some of any such embodiments, each different subject has the same or similar disease or condition. In some of any such embodiments, the source type of cells is a whole blood sample, an apheresis sample, or a leukapheresis sample. In some of any such embodiments, the source type of cells is an enriched population of cells, optionally an enriched population of T cells. In some of any such embodiments, the source type of cells is an engineered population of cells comprising a nucleic acid encoding a recombinant protein, optionally wherein the recombinant protein has been introduced into the population of cells by gene transfer, optionally transduction. In some of any such embodiments, the source type of cells is a cell therapy.

In some of any such embodiments, the source type of cells is an enriched population of T cells. In some of any such embodiments, the recombinant protein has been introduced into the population of cells by gene transfer. In some of any such embodiments, the recombinant protein has been introduced into the population of cells by transduction.

In some of any such embodiments, the plurality of the first reference cell sample comprise greater than 2, 5, 10, 25, 50, 100, 200, 300, 400, 500, 600, 700, 800, 900, or 1000 cell samples. In some of any such embodiments, the plurality of the second reference cell sample comprise greater than 2, 5, 10, 25, 50, 100, 200, 300, 400, 500, 600, 700, 800, 900, or 1000 cell samples.

In some of any such embodiments, each of the plurality of the first and second reference cell sample is a source type of cells from a subject having a disease or condition in a clinical trial. In some of any such embodiments, the source type of cells is an autologous cell therapy, and each of the first and second reference cell sample is a sample of the cell therapy from a subject in a clinical trial for testing the cell therapy. In some of any such embodiments, the cell therapy is a T cell therapy, optionally a CAR-T cell therapy, TCR-T cell therapy, or a TIL therapy. In some of any such embodiments, the cell therapy is an NK cell therapy. In some of any such embodiments, the cell therapy is a stem cell therapy.

In some of any such embodiments, the cell therapy is a CAR-T cell therapy. In some of any such embodiments, the cell therapy is a TCR-T cell therapy. In some of any such embodiments, the cell therapy is a TIL therapy.

In some of any such embodiments, the test cell sample and each of the second reference cell sample have been subjected to cell staining with one or more staining reagents for labeling the cells with the one or more fluorescent signals. In some of any such embodiments, the one or more staining reagents comprise a binding agent specific to a marker and a fluorescent dye able to emit one of the one or more fluorescent signal. In some of any such embodiments, the marker is a cell surface marker or a viability marker.

In some of any such embodiments, each of the one or more staining reagents comprises a binding agent specific to a marker and a fluorescent dye able to emit one of the one or more fluorescent signal.

In some of any such embodiments, at least one marker is a prevalent attribute expressed or suspected of being expressed on at least 5% or more of cells in the sample. In some of any such embodiments, at least one marker is a low prevalence attribute expressed or suspected of being expressed on less than 5% of cells in the sample. In some of any such embodiments, the sample is the test cell sample and each of the second reference cell sample.

In some of any such embodiments, the one or more fluorescent signals comprise two or more different fluorescent signals. In some of any such embodiments, the cell staining is a multi-color cell staining for labeling the cells with two or more different fluorescent signals, wherein each staining reagent labels a different marker with a different fluorescent signal. In some of any such embodiments, the two or more different fluorescent signals comprise 2 to 10 fluorescent signals, optionally at or about 2, 3, 4, 5 or 6 fluorescent signals. In some of any such embodiments, each of the two or more different fluorescent signals has a different emission spectra and/or wherein the peak emission spectra of each fluorescent signal do not overlap. In some of any such embodiments, the two or more different fluorescent signals is a signal emitted by a dye selected from the group consisting of PE-Cy7, APC, AF700, BV421, Aqua, and BV605.

In some of any such embodiments, the two or more different fluorescent signals comprise at or about 2, 3, 4, 5 or 6 fluorescent signals. In some of any such embodiments, each of the two or more different fluorescent signals has a different emission spectra. In some of any such embodiments, the peak emission spectra of each fluorescent signal do not overlap. In some of any such embodiments, each of the two or more different fluorescent signals is a signal emitted by a dye selected from the group consisting of PE-Cy7, APC, AF700, BV421, Aqua, and BV605.

In some of any such embodiments, the cell staining of the test cell sample and each of the second reference cell sample is carried out with the same staining reagents and using the same protocol conditions.

In some of any such embodiments, the plurality of the second reference cell sample comprises duplicate samples of the same stained cells. In some of any such embodiments, the plurality of the second reference cell sample comprises triplicate samples of the same stained cells.

In some of any such embodiments, the static fluorescence threshold gate for at least one fluorescent signal is a fluorescence that is greater than the $95^{th}$ percentile of fluorescence among the plurality of the first reference cell sample for the fluorescent signal. In some of any such embodiments, the static fluorescence threshold gate for at least one of the one or more fluorescent signals is a fluorescence that is greater than the $97^{th}$ percentile of fluorescence among the plurality of the first reference cell sample for the fluorescent signal. In some of any such embodiments, the static fluorescence threshold gate for at least one of the one or more fluorescent signals is a fluorescence that is greater than the $99^{th}$ percentile of fluorescence among the plurality of the first reference cell sample for the fluorescent signal.

In some of any such embodiments, the static fluorescence threshold gate for at least one of the one or more fluorescent signals is a fluorescence that is less than the $5^{th}$ percentile of fluorescence among the plurality of the second reference cell sample for the fluorescent signal. In some of any such embodiments, the static fluorescence threshold gate for at least one of the one or more fluorescent signals is a fluorescence that is less than the $3^{rd}$ percentile of fluorescence among the plurality of the second reference cell sample for the fluorescent signal. In some of any such embodiments, the static fluorescence threshold gate for at least one of the one or more fluorescent signals is a fluorescence that is less than the $1^{st}$ percentile of fluorescence among the plurality of the second reference cell sample for the fluorescent signal.

In some of any such embodiments, when the fluorescence of a population of unstained cells and a population of stained cells for a fluorescent signal differs by more than 2-fold, the static fluorescence threshold gate is set at less than the $1^{st}$ percentile of fluorescence or less than all percentiles of fluorescence among the plurality of the second reference cell sample for the fluorescent signal. In some of any such embodiments, when the fluorescence of a population of unstained cells and a population of stained cells for a fluorescent signal differs by more than 5-fold, the static fluorescence threshold gate is set at less than the $1^{st}$ percentile of fluorescence or less than all percentiles of fluorescence among the plurality of the second reference cell sample for the fluorescent signal. In some of any such embodiments, when the fluorescence of a population of unstained cells and a population of stained cells for a fluorescent signal differs by more than 10-fold, the static fluorescence threshold gate is set at less than the $1^{st}$ percentile of fluorescence or less than all percentiles of fluorescence among the plurality of the second reference cell sample for the fluorescent signal.

In some of any such embodiments, for a low prevalence attribute, the setting of the static fluorescence threshold gate further comprises identifying mean fluorescence intensity (MFI) for one or more of the one or more fluorescent signals.

In some of any such embodiments, for each of the one or more fluorescent signals, the static fluorescence threshold gate is an even number on a logarithmic flow axis. In some of any such embodiments, for each of the one or more fluorescent signals, the static fluorescence threshold gate is rounded to the nearest 10, is rounded to the nearest 100, or is rounded to the nearest 1,000, on a logarithmic flow axis.

In some of any such embodiments, the method further comprises identifying a subset of cells from the test cell sample that have a fluorescence signal above the static fluorescence threshold gate for at least two of the one or more fluorescent signals, at least three of the one or more fluorescent signals, at least four of the one or more fluorescent signals, at least five of the one or more fluorescent signals, at least six of the one or more fluorescent signals, or at least seven or more of the one or more fluorescent signals.

In some of any such embodiments, the method further comprises identifying a subset of cells from the test cell sample that have a fluorescence signal above the static fluorescence threshold gate for all of the one or more fluorescent signals.

In some of any such embodiments, the static fluorescence threshold gate includes at least 91%, at least 92%, at least 93%, at least 94%, at least 95%, at least 96%, at least 97%, at least 98%, or at least 99% of the population of stained cells of the test cell sample. In some of any such embodiments, the static fluorescence threshold gate for each of the one or more fluorescent signals is set such that it includes at least 95%, at least 96%, at least 97%, at least 98%, or at least 99% of the population of stained cells of the test cell sample.

In some of any provided embodiments, for the identified subset of cytometry events for at least one of the one or more fluorescent signals, the method further comprises assessing the fluorescence intensity of the at least one fluorescent signal of the identified subset of cytometry events. In some of any provided embodiments, for each of the identified subset of cytometry events for each of the one or more fluorescent signals, the method further comprises assessing the intensity of the fluorescent signal of the identified subset of cytometry events. In some embodiments, the fluorescence intensity is the mean fluorescence intensity.

In some of any provided embodiments, for the identified subset of cytometry events for at least one of the one or more fluorescent signals, the method further comprises determining the percentage of the identified subset of cytometry events compared to the total number of collected cytometry events. In some embodiments, for each of the identified subset of cytometry events for each of the one or more fluorescent signals, the method further comprises determining the percentage of the identified subset of cytometry events for the respective fluorescent signal compared to the total number of collected cytometry events.

In some of any provided embodiments, the method comprises calibration of the one or more fluorescent signals by the flow cytometer. In some embodiments, the calibration is carried out at least once daily.

BRIEF DESCRIPTION OF THE DRAWINGS

FIG. 1A depicts a plurality of cell populations from different samples, and identifies the upper boundary of the negative, unstained cell populations and the lower boundary of positive, stained cell populations, and also depicts the fluorescence threshold that is set to separate the negative unstained cell population from the positive stained cell population. FIG. 1B depicts a representative histogram analysis of negative unstained cell populations (left) and positive stained cell populations (right), where the mean fluorescence intensity (MFI) and the $95^{th}$ and $99^{th}$ percentiles of fluorescence were determined for the negative unstained cell populations (left), and the MFI and the $1^{st}$ and $5^{th}$ percentiles of fluorescence were determined for the positive stained cell populations (right).

FIGS. 2A and 2B depict the analysis of negative unstained cell populations (FIG. 2A) and positive stained cell populations (FIG. 2B) for a prevalent attribute, using the AF700 fluorophore.

DETAILED DESCRIPTION

Figures 1A, 1B:
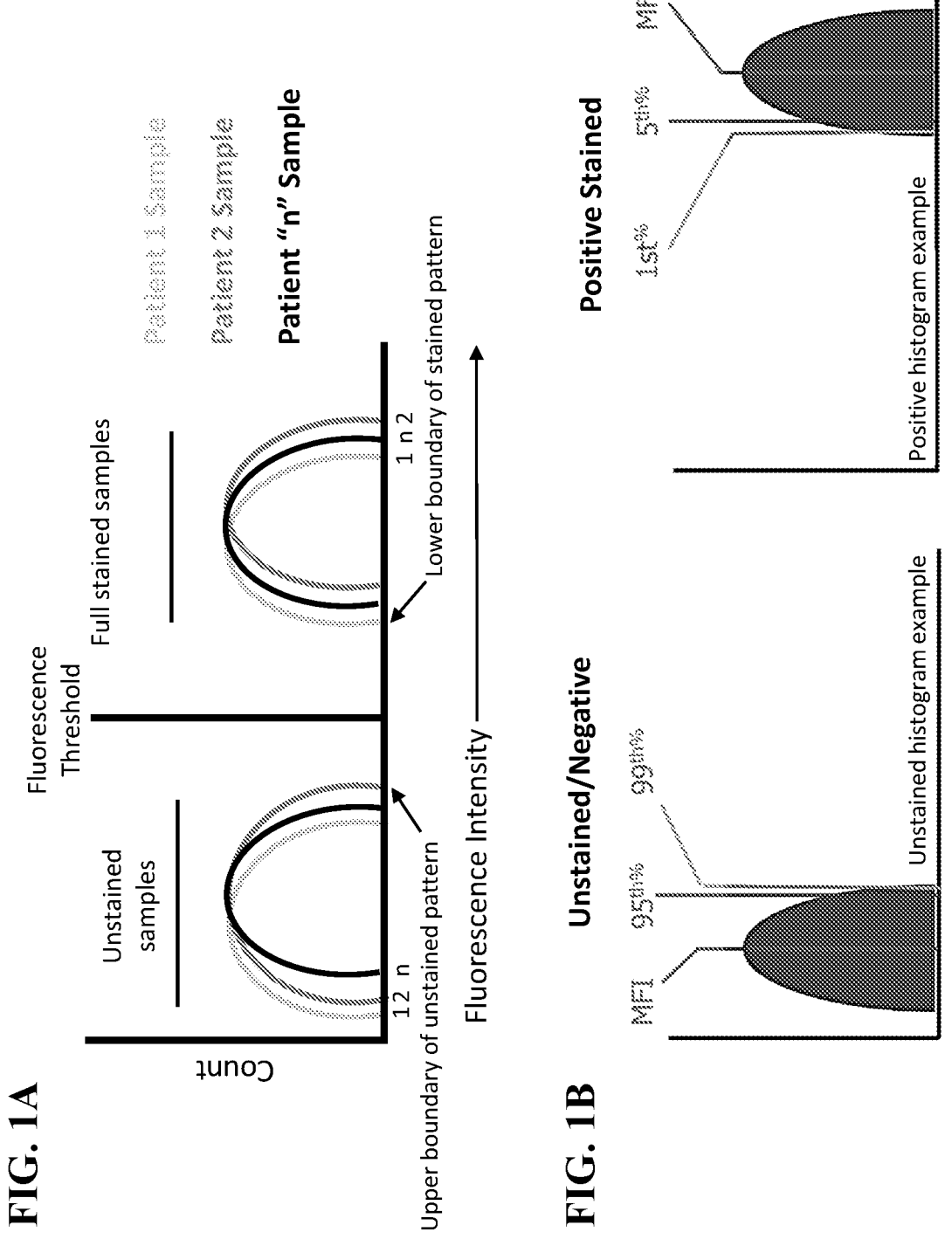
FIGS. 1A and 1B depict graphical representations of the analysis of flow cytometry events.

Provided herein are methods of determining a static fluorescence threshold gate in connection with gating cells in flow cytometry methods. In some embodiments, the provided methods provide for an automated gating method that is fast and efficient and, in some aspects, can be carried out on cells in a high throughput manner. The provided methods are particularly useful for quality control assessment of cells, such as for purposes of assessing certain attributes or features of cells. In some embodiments, the provided methods for setting a static gate threshold utilize reference cell populations known or suspected of having similar characteristic or features of a test cell sample of interest. Once set, the static threshold gate can be applied to one or more test cell sample. In some aspects, the provided methods are particularly useful in assessing similar cell samples (e.g., same source type of cells) among subjects in a clinical trial or study or being treated according to the same or similar treatment regimen. In particular embodiments, the provided methods can be used to assess or characterize cell therapies (e.g., T cell therapies, such as CAR-T cells), particularly those produced or generated according to similar protocols or procedures or from a like group of subjects (e.g., subjects with the same underlying disease or condition).

In some embodiments, the methods for determining a static gate threshold includes: (1) measuring cytometry events by flow cytometry for one or more fluorescent signals for a plurality of at least two reference cell samples, the plurality of at least two reference cell samples comprising: (a) a plurality of a first reference cell sample each comprising a population of unstained cells that have not been labeled with the one or more fluorescent signals; and (b) a plurality of a second reference cell samples, wherein each of the plurality of second reference cell samples are derived from the same source type of cells as one of the plurality of the first reference cell sample, and wherein each of the plurality of second reference cell sample comprise at least one population of stained cells that have been labeled with at least one of the one or more fluorescent signals; and (2) setting a static fluorescence threshold gate for each of the one or more fluorescent signal. In some embodiments of the provided methods, the static fluorescent threshold gate is set to maximize including positive (stained) cells and minimize including negative (unstained) cells. In some embodiments, for each fluorescent signal of a labeled attribute (e.g., staining by a marker-specific fluorophore dye), the static gate threshold is set based on an upper boundary of fluorescence of cells for each of the one or more fluorescent signals among the first reference cell samples and a lower boundary of fluorescence based on a lower boundary of fluorescence of cells for each of the one or more fluorescent signals among the second reference cell samples. In some embodiments, the upper and lower boundaries are determined as a percentile of the distribution of fluorescence in the samples, such as to maximize including positive/stained cells and to minimize excluding negative/unstained cells.

In some embodiments, provided methods also include applying the static fluorescence threshold gate to cytometry events from a test population of labeled cells that have been labeled (stained) for the same attributes (e.g., markers) using the same one or more fluorescent signals as used to set the static gate threshold. In some embodiments, applying the static fluorescence threshold gate can be used to assess features or characteristics of a desired population of interest. Provided herein are methods of selecting a subset of cytometry events from flow cytometry data, comprising: (1) receiving flow cytometry data comprising a plurality of cytometry events from a test population of labeled cells sorted according to one or more fluorescent signals measured by a flow cytometer; (2) applying a static fluorescence threshold gate individually to each of the one or more fluorescent signals; and (3) for each of the one or more fluorescent signals, identifying a subset of cytometry events from the test population of cells that have a fluorescence signal above the static threshold gate.

In some embodiments, for the identified subset of cytometry events for at least one of the one or more fluorescent signal, the method further comprises assessing the fluorescence intensity of the at least one fluorescent signal of the identified subset of cytometry events. In some embodiments, for each of the identified subset of cytometry events for each of the one or more fluorescent signal, the method further comprises assessing the intensity of the fluorescent signal of the identified subset of cytometry events. In some embodiments, the fluorescence intensity is the mean fluorescence intensity. In some embodiments, for the identified subset of cytometry events for at least one of the one or more fluorescent signal, the method further comprises determining the percentage of the identified subset of cytometry events compared to the total number of collected cytometry events. In some embodiments, for each of the identified subset of cytometry events for each of the one or more fluorescent signal, the method further comprises determining the percentage of the identified subset of cytometry events for the respective fluorescent signal compared to the total number of collected cytometry events.

Flow cytometry is a technology that is used to analyze the physical and chemical properties of particles, such as molecules, analyte-bound beads, or individual cells, in a sheath fluid as it passes through one or more lasers. Most commonly cell particles are fluorescently labelled and then excited by the laser to emit light at varying wavelengths. Flow cytometers are widely used to enumerate cell subsets based upon the binding of fluorescent monoclonal antibodies. These instruments are designed to cause cells in suspension to travel in single-file through a laser beam for interrogation. Cells are then classified by the way in which they scatter the incident laser light, which provides information on the size and internal granularity of the cells. Further, any fluorescent light they may emit permits the detection of specific antibody binding, and thus subsequent cell-subset identification. A general description of standard flow cytometry apparatus and methods is provided in U.S. Pat. No. 4,284,412 to Hoffman and Hansen entitled "Method and Apparatus for Automated Identification and Enumeration of Specified Blood Cell Subclasses" and incorporated by reference herein.

In some embodiments, a flow cytometer has five main components. First, a fluid sheath is formed that carries and aligns cells so that they may pass single file through a light beam for sensing. Second, a measurement system, usually a laser beam in which the beam is aligned with the fluid sheath. Third, a detector and an analog to digital conversion system, which converts the analog measurements of measured parameters, e.g., forward-scattered light and side-scattered light, from the laser beam into digital signals that can be processed by a computing system. Fourth, an amplification system, linear or logarithmic. Lastly, a computer system for analysis of the signals. Flow cytometers are capable of analyzing thousands of particles every second, and can actively separate and isolate particles having specific physical or chemical properties. The process of collecting data from samples using flow cytometry is called acquisition. Acquisition is mediated by a computer physically connected to the flow cytometer and receiving digital or analog signals from the flow cytometer. Modern flow cytometers typically have multiple lasers and detectors incorporated to detect multiple antibodies or markers on the surface of the particles.

Flow cytometry devices and other particle analyzers (e.g., mass cytometers) provide for the identification and characterization of particles (e.g., cells) based on certain predetermined parameters, e.g., optical parameters including light scatter and fluorescence. In flow cytometry, for example, particles (e.g., cells) in a fluid suspension are passed by a detection region in which the particles are exposed to an excitation light, typically from one or more lasers, and the light scattering and fluorescence properties of the particles are measured. Particles or components thereof are typically labeled with one or more fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one for each of the distinct dyes to be detected are included in the analyzer. The data obtained comprise the signals measured for each of the light scatter parameters and the fluorescence emissions.

In some embodiments, sensors in the detection region are arranged in order to detect a plurality of different properties simultaneously, e.g., for each of the used fluorescent dyes, and one or more light scattering properties such as forward-scattered light (FCS), side-scattered light (SSC), etc. For instance, the parameters measured using a flow cytometer typically include FSC, which is the excitation light that is scattered by the particle along a mostly forward direction; SSC, which is the excitation light that is scattered by the particle in a mostly sideways direction, and the light emitted from each of the fluorescent dyes in a channel (range of frequencies) of the spectrum, referred to as FL1, FL2, etc. These sensors, e.g., photodetectors, obtain the data for the particles in real-time as they pass through the detection region, and transmit the data to computer readable media for data storage.

In some embodiments, flow cytometry samples can include a large number of points in multi-dimensional space. In some embodiments, the dimension is somewhere between about 3 and 15 and the number of points (or cytometry events), usually corresponding to cells, is often between tens of thousands and hundreds of thousands. In aspects of flow cytometry analysis, two of the dimensions usually correspond to the intensity of forward scatter and side scatter which characterize the physical properties of the cell (e.g., size and granularity). The remaining dimensions correspond to the intensity of the cell's fluorescence at a given wavelength (color).

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Shapiro HM: *Practical Flow Cytometry.* 4th edition. New York: John Wiley & Sons; 2003; all incorporated herein by reference. Fluorescence imaging microscopy is described in, for example, Pawley (ed.), Handbook of Biological Confocal Microscopy, 2nd Edition, Plenum Press (1989), incorporated herein by reference.

In some aspects, cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured parameters. The use of standard file formats, such as an "FCS" file format, for storing data from a flow cytometer facilitates analyzing data using separate programs and/or machines. Using current analysis methods, the data typically are displayed in 2-dimensional (2D) plots for ease of visualization, but other methods may be used to visualize multidimensional data.

In some embodiments, flow cytometry data will plot each event independently, and will represent the signal intensity of light detected in each channel for every event. In some aspects, a histogram typically plots the intensity detected in a single channel along one axis and the number of events detected at that intensity is in a separate axis. A large number of events detected at one particular intensity will be displayed as a spike on the histogram. In other aspects, events are plotted as a dot-plot which is a plot that compares 2 or 3 parameters simultaneously on a two- or three-dimensional scatter-plot. In a dot plot, each event is represented as a single point on a scatter-plot. For a 2D plot, intensity of 2 different channels are represented along the two axes. For a 3-dimensional (3D) plot, intensity of 3 different channels are represented along the various axes. Events with similar intensities will cluster together in the same region on the scatter-plot. For instance, for dot-plot data, large samples will often result in a heavy cluster of events represented in the same region of the plot. There are many methods for adding additional resolution to these regions of a dot-plot. For example, a heat map, may be used to provide information about event density in a given region of the plot.

The data obtained is multidimensional in nature, wherein each particle may correspond to a point in a multidimensional space defined by the measured parameters. Populations, or clusters, of certain types of cells are identified based on their correlation to each other in this multidimensional space. Different cell types can be identified by the scatter parameters and the fluorescence emissions resulting from labeling various cell proteins with dye-labeled antibodies. The identification of clusters and, thereby, populations can be carried out by gating of the cells. Typically, gates corresponding to subsets of particles of interest, such as CD4+ lymphocytes in a blood sample, are defined by users with the aid of software operationally associated with the flow system. The gates, in turn, provide the user with a convenient method for selecting subsets of particles for counting, isolation, or other manipulation. Gating is used to help make sense of the large quantity of data that may be generated from a sample. Accordingly, facilitating the creation and manipulation of gates efficiently can help improve the speed and accuracy of understanding what the results mean.

In some embodiments, a gate may be a "threshold" gate, which is a gate for only one optical parameter that defines an open region within the multidimensional space. In most existing methods, "threshold" gating has primarily only been used for forward light scatter to remove high frequency low level signals caused by items, such as debris in the sample, which would overwhelm the processing capability of the detection system electronics which are designed for processing signals generated by particles of interest. More commonly, "window" gating is employed, which usually define closed regions in the multidimensional space, e.g., by defining upper and lower bounds for signal values. In "window" gating the regions are generated to correspond to particles or cell types that are to be counted, sorted, or excluded. In some embodiments, gating is carried out on a 2D-plot of two parameters, such as side scatter (e.g., on vertical axis) and a fluorescence signal (e.g., on horizontal axis).

In some embodiments, traditional flow cytometry gating controls typically utilize isotype gating controls or fluorochrome conjugated antibodies, which are industry standard gating controls for flow cytometry methods, particularly in quality control settings. In some aspects, such methods can be advantageous because they allow objective gate placement. On the other hand, such methods are associated with one or more disadvantages such as decreased throughput per plate, increased assay complexity (e.g., time, failure rate, sample volume required) and increased cost of goods.

Further, in many existing methods, gating is carried out manually by drawing a gate around a population displayed in one or more 2-dimensional plots, referred to as "scatter plots" or "dot plots" of cytometry events present in the data. In manual gating, a user collects flow cytometry data (or cytometry events) from one or more channels representing one or more different parameters, e.g., SSC, FSC or different fluorescent signals, on a dot-plot. Based on the data acquired, the user draws a gate box selecting a subpopulation of cells for further analysis. The researcher may use one of several tools to draw geometric gates such as a rectangle, ellipse, or polygon. The subpopulation of cells within the gate will be specifically highlighted on other plots displaying information from one or more other alternative channels. Multiple gates can be established for a single scatter-plot, and gates can be "stacked" and combined (i.e. a subpopulation of cells gated for in channels 1 and 2 can be further gated for channels 3 and 4 to allow for more specificity and deeper analysis). Manual plotting is typically used because of its flexibility and its intuition, however manual sequential gating to extract interested cell populations is tedious and labor intensive at larger file sizes. Furthermore, the tools may not permit drawing a precise gate as the data of interest may not be entirely geometric or easily represented using the available tools. In addition, manual gating also can result in variability among different users carrying out the manual gating. Thus, improved methods are needed.

The provided methods are based on generating fluorescent threshold as gates for each attribute (e.g., labeled with a fluorescent signal) in a flow cytometry panel. The provided embodiments involving use of a static gate threshold are particularly advantageous on samples where there is good resolution between positive and negative staining, sufficient representative reference samples (e.g., clinical samples), and environments that have robust fluorescence control of cytometers and reagents. As demonstrated herein, the provided embodiments of setting and using a static gate threshold appropriately exclude background fluorescence, for example as applied to FMO samples. In addition, the reportables are equivalent to the current gating methods. Finally, the provided methods are precise with low user to user variability, such as less than 3% coefficient of variation for all assessed attributes. The provided methods thus provide an improved alternative for assessing stained cell samples by flow cytometry, particularly in environments where quick and high-throughput quality control is desired to be carried out.

The techniques described herein may be implemented in hardware, software, firmware, or any combination thereof. Such techniques may be implemented in any of a variety of devices such as general purposes computers, wireless communication devices, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), nonvolatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. FLOW CYTOMETRY AND DATA ACQUISITION

In some embodiments, the methods provided herein comprise receiving flow cytometry data. In some embodiments, the method comprises receiving flow cytometry data comprising a plurality of cytometry events from a test population of labeled cells sorted according to one or more fluorescent signals measured by a flow cytometer. In some embodiments, the test population of cells is or is comprised within a sample, e.g., a biological sample. In provided embodiments, the test population of cells is stained with one or more fluorescent signals for labeling one or more attributes of the cell sample, and assessed by flow cytometry to collect cytometry events. The cytometry events can be analyzed by setting a static gate threshold as described herein, including in accord with the methods described in Section II.

In some embodiments, flow cytometry data collection involves numerous principles such as fluidic systems, optics and detection, signal processing, and electrostatic cell sorting. In some embodiments, flow cytometry is used to measure the properties of individual particles, such as individual cells, from a sample.

In some embodiments, flow cytometry data collection begins with the collection of a flow cytometry cell sample. In acquiring flow cytometry cell samples, a flow cytometry protocols involving direct or indirect staining of cell samples can be used. Direct staining flow cytometry protocols is one of the most common staining methods, where live or fixed cells are incubated with directly labeled antibodies against cell surface antigens. Indirect staining flow cytometry is used if there is not a directly labeled antibody available, or if the goal is to amplify the signal already acquired. Indirect staining flow cytometry is where a cell is stained with a primary antibody against the antigen of interest and visualize using a labeled secondary antibody which recognizes the first, primary antibody. Other variants of staining are possible, as will be known by those of skill in the art, for instance, intracellular staining to be used when the antigen is not present on the cell surface.

In some embodiments, the cells for staining (e.g., test sample) may be a cell line or cells from a biological sample. Any biological sample containing cells of interest can be obtained for staining. In some embodiments, the biological sample is obtained from or derived from a subject, such as one having a particular disease or condition or in need of a therapy (e.g., cell therapy) or to which therapeutic treatment (e.g., cell therapy) will be administered. In some aspects, the subject is a human, such as a subject who is a patient in need of a particular therapeutic intervention. Accordingly, the cells in some embodiments are primary cells, e.g., primary human cells. The samples include tissue, fluid, and other samples taken directly from the subject. The biological sample can be a sample obtained directly from a biological source or a sample that is processed. Biological samples include, but are not limited to, body fluids, such as blood, plasma, serum, cerebrospinal fluid, synovial fluid, urine and sweat, tissue and organ samples, including processed samples derived therefrom.

In some aspects, the sample is blood or a blood-derived sample, or is or is derived from an apheresis or leukapheresis product. Exemplary samples include whole blood, peripheral blood mononuclear cells (PBMCs), leukocytes, bone marrow, thymus, tissue biopsy, tumor, leukemia, lymphoma, lymph node, gut associated lymphoid tissue, mucosa associated lymphoid tissue, spleen, other lymphoid tissues, liver, lung, stomach, intestine, colon, kidney, pancreas, breast, bone, prostate, cervix, testes, ovaries, tonsil, or other organ, and/or cells derived therefrom. Samples include, in the context of cell therapy, e.g., adoptive cell therapy, samples from autologous and allogeneic sources.

In some examples, cells from the circulating blood of a subject are obtained, e.g., by apheresis or leukapheresis. The samples, in some aspects, contain lymphocytes, including T cells, monocytes, granulocytes, B cells, other nucleated white blood cells, red blood cells, and/or platelets, and in some aspects contains cells other than red blood cells and platelets.

In some embodiments, the blood cells collected from the subject are washed, e.g., to remove the plasma fraction and to place the cells in an appropriate buffer or media for subsequent processing steps. In some embodiments, the cells are washed with phosphate buffered saline (PBS). In some embodiments, the wash solution lacks calcium and/or magnesium and/or many or all divalent cations. In some aspects, a washing step is accomplished a semi-automated "flow-through" centrifuge (for example, the Cobe 2991 cell processor, Baxter) according to the manufacturer's instructions. In some aspects, a washing step is accomplished by tangential flow filtration (TFF) according to the manufacturer's instructions. In some embodiments, the cells are resuspended in a variety of biocompatible buffers after washing, such as, for example, $Ca^{2+}/Mg^{2+}$ free PBS. In certain embodiments, components of a blood cell sample are removed and the cells directly resuspended in culture media.

In some embodiments, the preparation methods include steps for freezing, e.g., cryopreserving, the cells, before staining. In some embodiments, the freeze and subsequent thaw step removes granulocytes and, to some extent, monocytes in the cell population. In some embodiments, the cells are suspended in a freezing solution, e.g., following a washing step to remove plasma and platelets. Any of a variety of known freezing solutions and parameters in some aspects may be used. In some embodiments, the cells are frozen, e.g., cryofrozen or cryopreserved, in media and/or solution with a final concentration of or of about 12.5%, 12.0%, 11.5%, 11.0%, 10.5%, 10.0%, 9.5%, 9.0%, 8.5%, 8.0%, 7.5%, 7.0%, 6.5%, 6.0%, 5.5%, or 5.0% DMSO, or between at or about 1% and at or about 15%, between at or about 6% and at or about 12%, between at or about 5% and at or about 10%, or between at or about 6% and at or about 8% DMSO. In particular embodiments, the cells are frozen, e.g., cryofrozen or cryopreserved, in media and/or solution with a final concentration of or of about 5.0%, 4.5%, 4.0%, 3.5%, 3.0%, 2.5%, 2.0%, 1.5%, 1.25%, 1.0%, 0.75%, 0.5%, or 0.25% HSA, or between 0.1% and −5%, between 0.25% and 4%, between 0.5% and 2%, or between 1% and 2% HSA. One example involves using PBS containing 20% DMSO and 8% human serum albumin (HSA), or other suitable cell freezing media. In some embodiments, this is then diluted 1:1 with media so that the final concentration of DMSO and HSA are 10% and 4%, respectively. In some embodiments, the cells are then frozen to or to about −80° C. at a rate of or of about 1° per minute and stored in the vapor phase of a liquid nitrogen storage tank.

In some embodiments, one or more preparation and/or non-affinity based cell separation steps can be carried out prior to staining of the cells. In some examples, cells are washed, centrifuged, and/or incubated in the presence of one or more reagents, for example, to remove unwanted components, enrich for desired components, lyse or remove cells sensitive to particular reagents. In some examples, cells are separated based on one or more property, such as density, adherent properties, size, sensitivity and/or resistance to particular components. In some embodiments, the methods include density-based cell separation methods, such as the preparation of white blood cells from peripheral blood by lysing the red blood cells and centrifugation through a Percoll or Ficoll gradient.

In some embodiments, cells of a cell population are labelled with one or more fluorescent markers (e.g., one or more fluorophores) that produce a fluorescent signal that can be measured by a flow cytometer. In some embodiments, at least a portion of the obtained sample is subjected to cell staining by incubation of cells in the sample with one or more staining reagent, in which each staining reagent contains a fluorescent signal or marker (e.g., fluorophore). The staining reagent can be any reagent for characterization, selection, or isolation of a particular cell type or subtype of cells. In some embodiments, the staining reagent or reagents is an immunoaffinity-based reagent, such as an antibody. In some embodiments, the staining reagent stains the cells based on the cells' expression or expression level of one or more markers, such as based on the expression or presence in or on the cell of one or more specific molecules, such as surface markers, e.g., surface proteins, intracellular markers, or nucleic acid. In some embodiments, the marker is a cell surface marker.

Any marker known or suspected of being expressed on cell types of interest in the sample can be targeted by the staining reagent. Exemplary markers include markers present on lymphocyte populations, such as T cells. In some embodiments, the sample may be a whole blood sample. In some embodiments, the sample is an apheresis sample. In some embodiments, the sample is a leukapheresis sample. In some embodiments, a cell surface marker may include one or more surface markers CD3, CD4, CD8, CD45, CD45RA, CD45RO, CD28, CD62L, CCR7, CD27, CD95, CD127. In some embodiments, such cells are selected by incubation with one or more antibody or binding partner that specifically binds to such markers.

In some embodiments, the marker may be a marker against a recombinant protein known to be expressed on or by one or more cells in the population. In some embodiments, a polynucleotide encoding the marker may be introduced into cells by cell transformation methods, such as cell transfection or transduction. In some embodiments, the marker is a recombinant receptor, such as a chimeric antigen receptor (CAR) or a TCR. In some embodiments, a staining reagent for a CAR may be an antibody directed against the antigen-binding domain (e.g., anti-idiotype antibody) or against the spacer region of the extracellular domain of the CAR (e.g., immunoglobulin hinge region). In some embodiments, a staining reagent for a TCR may be an major histocompatibility complex (MHC) tetramer.

In some embodiments, the marker is a recombinant protein that is a surrogate marker (also called transduction marker) that is co-expressed with another recombinant protein in the cell. A transduction marker or a surrogate marker can be used to detect cells that have been introduced with the polynucleotide, e.g., a polynucleotide encoding a recombinant protein. In some embodiments, the transduction marker can indicate or confirm modification of a cell. In some embodiments, the surrogate marker is a protein that is made to be co-expressed on the cell surface with a recombinant receptor, e.g., CAR. In particular embodiments, such a surrogate marker is a surface protein that has been modified to have little or no activity. In certain embodiments, the surrogate marker is encoded on the same polynucleotide that encodes the recombinant protein (e.g., recombinant receptor). In some embodiments, the nucleic acid sequence encoding the recombinant protein is operably linked to a nucleic acid sequence encoding a marker, optionally separated by an internal ribosome entry site (IRES), or a nucleic acid encoding a self-cleaving peptide or a peptide that causes ribosome skipping, such as a 2A sequence, such as a T2A, a P2A, a E2A or a F2A. Extrinsic marker genes may in some cases be utilized in connection with engineered cell to permit detection or selection of cells and, in some cases, also to promote cell suicide.

Exemplary surrogate markers can include truncated forms of cell surface polypeptides such as truncated forms that are non-functional and to not transduce or are not capable of transducing a signal or a signal ordinarily transduced by the full-length form of the cell surface polypeptide, and/or do not or are not capable of internalizing. Exemplary truncated cell surface polypeptides including truncated forms of growth factors or other receptors, such as a truncated human epidermal growth factor receptor 2 (tHER2), a truncated epidermal growth factor receptor (EGFRt) or a prostate-specific membrane antigen (PSMA) or modified form thereof. EGFRt may contain an epitope recognized by the antibody cetuximab (Erbitux®) or other therapeutic anti-EGFR antibody or binding molecule, which can be used to identify or select cells that have been engineered with the EGFRt construct and a recombinant receptor, such as a chimeric antigen receptor (CAR), and/or to eliminate or separate cells expressing the receptor. See U.S. Pat. No. 8,802,374 and Liu et al., Nature Biotech. 2016 April; 34(4): 430-434). In some aspects, the marker, e.g., surrogate marker, includes all or part (e.g., truncated form) of CD34, a NGFR, a CD19 or a truncated CD19, e.g., a truncated non-human CD19, or epidermal growth factor receptor (e.g., tEGFR). In some embodiments, the nucleic acid encoding the marker is operably linked to a polynucleotide encoding for a linker sequence, such as a cleavable linker sequence, e.g., T2A. For example, a marker, and optionally a linker sequence, can be any as disclosed in PCT Pub. No. WO2014031687. For example, the marker can be a truncated EGFR (tEGFR) that is, optionally, linked to a linker sequence, such as a T2A cleavable linker sequence.

In some embodiments, the surrogate marker is or comprises a fluorescent protein, such as green fluorescent protein (GFP), enhanced green fluorescent protein (EGFP), such as super-fold GFP, red fluorescent protein (RFP), such as tdTomato, mCherry, mStrawberry, AsRed2, DsRed or DsRed2, cyan fluorescent protein (CFP), blue green fluorescent protein (BFP), enhanced blue fluorescent protein (EBFP), and yellow fluorescent protein (YFP), and variants thereof, including species variants, monomeric variants, and codon-optimized and/or enhanced variants of the fluorescent proteins. In some embodiments, the marker is or comprises an enzyme, such as a luciferase, the lacZ gene from *E. coli*, alkaline phosphatase, secreted embryonic alkaline phosphatase (SEAP), chloramphenicol acetyl transferase (CAT). Exemplary light-emitting reporter genes include luciferase (luc), β-galactosidase, chloramphenicol acetyltransferase (CAT), β-glucuronidase (GUS) or variants thereof.

In some embodiments, the marker is a cell health marker. Non-limiting examples of cell health markers include caspase cleavage products such as dye substrates, c-PARP, cleaved cytokeratin 18, cleaved caspase, cleaved caspase 3, cytochrome C, apoptosis inducing factor (AIF), Inhibitor of Apoptosis (IAP) family members, as well as other molecules such as Bcl-2 family members including anti-apoptotic proteins (MCL-1, BCL-2, BCL-XL), BH3-only apoptotic sensitizers (PUMA, NOXA, Bim, Bad), and pro-apoptotic proteins (Bad, Bax) (see below), p53, c-myc proto-oncogene, APO-1/Fas/CD95, growth stimulating genes, or tumor suppressor genes, mitochondrial membrane dyes, Annexin-V, 7-AAD, Amine Aqua, trypan blue, propidium iodide or other viability dyes. In some embodiments, the marker is Annex V, which is a marker of apoptosis. Live cells can be stained with Annexin V which binds phosphatidylserine, which is normally intracellular, but is shifted to the cell surface when cells are undergoing apoptosis or other forms of cell death.

In some embodiments, the staining reagent is a fluorophore dye that is a viability dye selective for dead cells such that it emits fluorescence at a particular wavelength when bound to dead cells. In some embodiments, the viability dye is an amine reactive dye, such as an NHS active esters (which may include succinimidyl esters, sulfosuccinimidyl esters, tetrafluorophenyl esters, or sulfodichlorophenol esters) covalently bound to a dye. Such viability dyes permit cell viability detection based on the reaction of the fluorescent reactive dye with primary amines such as lysine residues in cellular proteins. These dyes cannot penetrate live cell membranes, so for live cells only cell surface proteins are available to react with the dye, resulting in dim staining. However, in dead cells, the reactive dye can permeate the damaged membranes of dead cells and stain both the interior and exterior amines, resulting more intense staining. In some embodiments, the covalently bound dye may be Alexa Fluor 405, Pacific Blue, Alexa Fluor 430, Fluorescein, Alexa Fluor 488, Texas Red, Alexa Fluor 594. In some embodiments, the fluorophore dyes can be defined as green, red, blue, violet, aqua or yellow. The green fluorescent and the red fluorescent dyes are excited by the 488 nm laser, the violet, the aqua and the yellow dyes require 405 nm excitation source with a different emission wave length, the blue fluorescent reactive dye requires UV excitation and finally the far red and near infrared dyes are excited at 633/635 nm. The availability of amine reactive dyes with different fluorochromes, which are excitable at different wavelengths, permits to choose the combination of reagents suitable for any configuration of the used flow cytometer.

In some embodiments, the viability dye is propidium iodide, DRAQ7, 7-AAD, eBioscience Fixable Viability Dye eFluor® 455UV, eBioscience Fixable Viability Dye eFluor® 450, eBioscience Fixable Viability Dye eFluor® 506, eBioscience Fixable Viability Dye eFluor® 520, eBioscience Fixable Viability Dye eFluor® 660, eBioscience Fixable Viability Dye eFluor® 780, BioLegend Zombie Aqua™, BioLegend Zombie NIR™, BioLegend Zombie Red™, BioLegend Zombie Violet™, BioLegend Zombie UV™, or BioLegend Zombie Yellow™.

In some embodiments, the staining reagent is composed of one or more fluorescent markers that may be attached, such as by chemical conjugation, to a binding agent that is able to bind, such as specifically bind, to the marker. In some embodiments, the binding agent is a protein. In some embodiments, the binding agent is an antibody or an antigen-binding fragment. The fluorescent marker may be conjugated to the binding agent, e.g., antibody, by any method known in the art.

As is well known in the art, an "antibody" is an immunoglobulin (Ig) molecule capable of specific binding to a target, such as a carbohydrate, polynucleotide, lipid, or polypeptide, through at least one epitope recognition site, located in the variable region of the Ig molecule. As used herein, the term encompasses not only intact polyclonal or monoclonal antibodies, but also fragments thereof, such as dAb, Fab, Fab', F(ab') 2, Fv), single chain (scFv), synthetic variants thereof, naturally occurring variants, fusion proteins comprising an antibody portion with an antigen-binding fragment of the required specificity, chimeric antibodies, nanobodies, and any other modified configuration of the immunoglobulin molecule that comprises an antigen-binding site or fragment (epitope recognition site) of the required specificity. Minibodies comprising a scFv joined to a CH3 domain are also included herein (S. Hu et al., Cancer Res., 56, 3055-3061, 1996). See e.g., Ward, E. S. et al., Nature 341, 544-546 (1989); Bird et al., Science, 242, 423-426, 1988; Huston et al., PNAS USA, 85, 5879-5883, 1988); PCT/US92/09965; WO94/13804; P. Holliger et al., Proc. Natl. Acad. Sci. USA 90 6444-6448, 1993; Y. Reiter et al., Nature Biotech, 14, 1239-1245, 1996; S. Hu et al., Cancer Res., 56, 3055-3061, 1996.

A binding agent, such as an antibody, that "specifically binds" or "preferentially binds" (used interchangeably herein) to marker is a term well understood in the art. A molecule is said to exhibit "specific binding" or "preferential binding" if it reacts or associates more frequently, more rapidly, with greater duration and/or with greater affinity with a particular marker target than it does with alternative markers. An antibody specifically binds or preferentially binds to a target if it binds with greater affinity, avidity, more readily, and/or with greater duration than it binds to other substances. It is also understood by reading this definition that specific binding or preferential binding does not necessarily require (although it can include) exclusive binding. Methods to determine such specific or preferential binding are also well known in the art, e.g., an immunoassay.

In provided embodiments, the binding agent, such as antibody, is conjugated to a fluorescent marker, such as a fluorophore. For instance, the cells may be incubated with one or more fluorescently labeled antibody. In some embodiments, any fluorescent marker or fluorophore suitable for use with flow cytometry analysis can be used. Some non-limiting examples of fluorescent markers include fluorescent proteins (e.g., GFP, YFP, RFP), fluorescent moieties (e.g., fluorescein isothiocyanate) (FITC), Phycoerythrin (PE), allophycocyanin (APC), Alexa Fluor (AF)), nucleic acid colorants (e.g., 4', 6-diamidino-2-phenylindole (DAPI), SYT016, propidium iodide (PI), cell membrane stain (e.g., FMI-43), cell functional dyes (e.g., Fluo-4, Indo-1), and synthetic dyes (e.g., Brilliant Violet (BV)). Exemplary fluorphores include, but are not limited to, hydroxycoumarin, Cascade Blue, Dylight 405 Pacific Orange, Alexa Fluor 430, Fluorescein, Oregon Green, Alexa Fluor 488, BODIPY 493, 2,7-Diochlorofluorescien, ATTO 488, Chromeo 488, Dylight 488, HiLyte 488, Alexa Fluor 532, Alexa Fluor 555, ATTO 550, BODIPY TMR-X, CF 555, Chromeo 546, Cy3, TMR, TRITC, Dy547, Dy548, Dy549, HiLyte 555, Dylight 550, BODIPY 564, Alexa Fluor 568, Alexa Fluor 594, Rhodamine, Texas Red, Alexa Fluor 610, Alexa Fluor 633, Dylight 633, Alexa Fluor 647, APC, ATTO 655, CF633, CF640R, Chromeo642, Cy5, Dylight 650, Alexa Fluor 680, IRDye 680, Alexa Fluor 700 (AF700), Cy5.5, ICG, Alexa Fluor 750, Dylight 755, IRDye 750, Cy7, PE-Cy7, Cy7.5, Alexa Fluor 790, Dylight 800, IRDye 800, BV421, BV510, BV570, BV605, BV650, BV711, BV750, BV785, Qdot® 525, Qdot® 565, Qdot® 605, Qdot® 655, Qdot® 705, or Qdot® 800.

In some embodiments, the one or more fluorescent markers comprise one or more fluorescent markers that detect a cellular attribute. The cellular attribute may be any marker that is an attribute of a particular cell or cell type. In some embodiments, each cellular attribute is selected from the group consisting of CD3, CD4, CD8, CD19, CD45, and Live/Dead (cellular viability).

In some embodiments, the cellular attribute is a prevalent attribute. A prevalent attribute, in some embodiments, is an attribute that is detectable in at least 5% or more of the sample, e.g., at least 5% or more of the cells in the population of cells of the sample. In some embodiments, for a sample containing a population of T cells, such as enriched for T cells, the prevalent attribute can include CD3, CD4, CD8, and/or CD45.

In some embodiments, the cellular attribute is a low prevalence attribute. A low prevalence attribute, in some embodiments, is an attribute that is detectable in less than 5% of the sample, e.g., less than 5% of the cells in the population of cells of the sample. In some embodiments, for a population of cells suspected of being healthy, the low prevalence attribute is Live/Dead (cellular viability). In some embodiments, for a population of cells enriched in T cells, a low prevalence attribute may be a B cell marker, such as CD19, CD20, CD22, and/or CD138.

In some embodiments, the one or more fluorescent markers comprise one or more fluorescent markers that each produce a fluorescent signal measured by a flow cytometer. Accordingly, in some embodiments, each of the one or more fluorescent signals detect a cellular attribute that is recognized by the fluorescent marker or stain.

In some embodiments, the fluorescent marker comprises a light emitting detection means, and the light emitting detection means advantageously emits light of at least a fluorescent wavelength emission. In some embodiments, the one or more fluorescent markers are chosen such that the emission wavelength spectrum of each fluorescent marker of the one or more fluorescent markers is distinguishable from the excitation wavelength spectrum of the other fluorescent markers of the one or more fluorescent markers. The different fluorescent markers may be excitable by the same wavelength of light or different wavelengths. Preferably, the emission wavelengths are different for each of the one or more fluorescent markers.

In some embodiments, multi-color staining or labeling is carried out using multiple fluorophores in which multiple staining reagents against different markers (e.g., cell surface markers) are incubated with cells. In some embodiments, the fluorescent marker, e.g., conjugated to the one or more staining reagents, such as antibodies, are selected to minimize energy transfer between them, such as to avoid or minimize overlapping emission and absorption spectra. In some embodiments, each fluorescent marker has a different emission spectra. In some embodiments, the multiple fluorescent marker may be excited with a single wavelength or multiple wavelengths, but detection occurs in regions where the peak emission spectra do not overlap. In some embodiments, excitation of one or more of the fluorescent markers may be by light at a single or the same wavelength, but whereby different wavelengths of light are emitted therefrom.

In some embodiments, the one or more fluorescent markers each individually comprise a fluorophore selected from the group consisting of PE-Cy7, APC, AF700, BV421, Aqua, and BV605.

In some embodiments, cells are stained with multiple staining reagents against multiple markers, such as cell surface markers. In some embodiments, this results in labeled cells with multiple markers, allowing for the characterization of well-defined subsets of cells.

In some embodiments, the cell staining involves incubation with an antibody or binding partner that specifically binds to such markers, which in some embodiments is followed by washing steps and separation of cells having bound the antibody or binding partner, from those cells having not bound to the antibody or binding partner. In some aspects of such processes, a volume of cells is mixed with an amount of a desired staining reagent and incubated under conditions for staining of the cells. In some embodiments, the staining or labelling is carried out at a temperature between 0° C. and 25° C., such as at or about 4° C. In some embodiments, the staining or labelling is carried out for greater than 5 minutes, typically greater than 15 minutes. In some embodiments, the staining or labelling is carried out for between 15 minutes and 6 hours, such as between 30 minutes and 2 hours. In some embodiments, the staining or labelling is carried out for example, at or about 15 minutes, 30 minutes, 1 hour, 1.5 hours, 2 hours, 2.5 hours, 3 hours, or any value between any of the foregoing. In some embodiments, the labeling with the one or more staining reagents is carried out simultaneously. In some embodiments, one or more wash steps are carried out prior to introducing the sample into the flow cytometer for analysis.

In some embodiments, the cell sample is prepared by suspending single cells at a density of $1 \times 10^6$ to $1 \times 10^7$ cells/ml in order to allow the cells to pass through the flow cytometer for reading. In some embodiments, this concentration of cells is called the fluid sheath. In some embodiments, the fluid sheath influences the rate of flow sorting, which typically progresses at around 2,000-20,000 cells per second. The cell sample's) fluid sheath is typically made of a phosphate buffered saline solution, but other solutions are available as will be known and understood by those skilled in the art.

In some embodiments, the sample is introduced into a flow cytometer. When a sample enters a flow cytometer, the particles are randomly distributed in the three-dimensional space of the cell sample. The cell sample is typically narrowed down to a single stream through a fluidics system with the application of hydro pressure. This stream is then passed through the one or more beams of light scattering or fluorescence emission. Lasers typically serves as the light source in flow cytometers. The laser produces a single wavelength of light that once contacted with the cell sample produces scattered light in the forward direction as a measure of cell size, scattered light in the side direction as a measure of cell complexity, and fluorescent light, also emitted in the side direction which is proportional to the relative amount of a particular cell marker. A photomultiplier tube (PMT) or photodiode receives light reflected from the cell. In some embodiments, light that originates from 0 to 20 degrees offset from the laser excitation line is known as forward scatter light. In some embodiments, light measured at an angle of approximately 90 degrees to the excitation line of the laser is called side scatter light and fluorescent signals. Both front scatter light and side scatter light are unique for every particle passing through the flow cytometer, and a combination of all can be used to differentiate particles in the cell sample. Fluorescent channels are usually indicated by the designations FL1, FL2, FL3, etc., depending on the number of channels in the instrument. Each fluorescent channel is set with barrier filters to detect a selected specific dye while filtering out all others. The channel in which a specific dye is predominantly detectable may be referred to as its primary fluorescent channel while other fluorescent channels may be designated as secondary channels. Scattered and fluorescent emitted light signals are converted to electronic pulses that are processed by the flow cytometry engine and displayed on a graphical user interface "GUI."

II. STATIC GATING THRESHOLDS

In some embodiments, the provided methods comprise applying a static fluorescence threshold gate individually to each of the one or more fluorescent signals, such as present in flow cytometry data collected from a test sample as described in Section I.

In some embodiments, a static fluorescence threshold gate for each of the one or more fluorescent signal is determined from: (a) cytometry events measured by flow cytometry for the one or more fluorescent signals for a plurality of at least two reference populations of cells each sorted according to the one or more fluorescent signals; and (b) setting a static fluorescence threshold gate for each of the one or more fluorescent signal.

In some embodiments, the static fluorescence threshold gate for each of the one or more fluorescent signals is determined from: (a) measuring cytometry events by flow cytometry for one or more fluorescent signals for a plurality of at least two reference populations of cells; and (b) setting a static fluorescence threshold gate for each of the one or more fluorescent signal.

A. Setting Static Gating Thresholds

Provided herein are methods of determining a static fluorescence threshold gate, comprising: (1) measuring cytometry events by flow cytometry for one or more fluorescent signals for a plurality of at least two reference cell samples, the plurality of at least two reference cell samples comprising: (a) a plurality of a first reference cell sample each comprising a population of unstained cells that have not been labeled with the one or more fluorescent signals; and (b) a plurality of a second reference cell sample, wherein each of the plurality of second reference cell sample are derived from the same source type of cells as one of the plurality of the first reference cell sample, and wherein each of the plurality of second reference cell sample comprise at least one population of stained cells that have been labeled with at least one of the one or more fluorescent signals; and (2) setting a static fluorescence threshold gate for each of the one or more fluorescent signal.

In some embodiments, the source type of cells of the reference cell samples is a population of cells from any biological sample containing cells of interest for staining. In some embodiments, the cells may be a cell line or cells from a biological sample. In some embodiments, the biological samples can include primary cells obtained from or derived from a subject, such as one having a particular disease or condition or in need of a treatment (e.g., with a cell therapy) or to which a therapeutic treatment (e.g., cell therapy) will be administered. In some aspects, the subject is a human, such as a subject who is a patient in need of a particular therapeutic intervention. Accordingly, the source type of cells in some embodiments are primary cells, e.g., primary human cells. The samples include tissue, fluid, and other samples taken directly from the subject. The biological sample can be a sample obtained directly from a biological source or a sample that is processed. Biological samples include, but are not limited to, body fluids, such as blood, plasma, serum, cerebrospinal fluid, synovial fluid, urine and sweat, tissue and organ samples, including processed samples derived therefrom.

In some aspects, the sample is blood or a blood-derived sample, or is or is derived from an apheresis or leukapheresis product. Exemplary samples include whole blood, peripheral blood mononuclear cells (PBMCs), leukocytes, bone marrow, thymus, tissue biopsy, tumor, leukemia, lymphoma, lymph node, gut associated lymphoid tissue, mucosa associated lymphoid tissue, spleen, other lymphoid tissues, liver, lung, stomach, intestine, colon, kidney, pancreas, breast, bone, prostate, cervix, testes, ovaries, tonsil, or other organ, and/or cells derived therefrom. Samples include, in the context of cell therapy, e.g., adoptive cell therapy, samples from autologous and allogeneic sources.

In some examples, cells from the circulating blood of a subject are obtained, e.g., by apheresis or leukapheresis. The samples, in some aspects, contain lymphocytes, including T cells, monocytes, granulocytes, B cells, other nucleated white blood cells, red blood cells, and/or platelets, and in some aspects contains cells other than red blood cells and platelets.

In some embodiments, the source type of cells may be a primary cell population isolated from a subject. In some embodiments, the isolated cell populations typically include a plurality of cell populations, e.g., populations of blood or blood-derived cells, such as hematopoietic cells, leukocytes (white blood cells), peripheral blood mononuclear cells (PBMCs), and/or cells of the immune system, e.g., cells of the innate or adaptive immunity, such as myeloid or lymphoid cells, e.g., lymphocytes, typically T cells and/or NK cells.

In some embodiments, the source type of cells is an enriched population of cells of a particular type or subtype, in which such cells have been selected from a starting cell sample (e.g., an apheresis or leukapheresis sample), such as by positive or negative selection of cells from the sample. Among the T cell populations that can be enriched and/or selected are populations of CD3+ T cells, CD4+ cells, CD8+ cells, and sub-populations of CD4+ and/or CD8+ T cells, including subpopulations of T cells generated by enrichment for or depletion of cells of a particular sub-type or based on a particular surface marker expression profile. For example, among the sub-types of T cells (e.g., CD4+ or CD8+ T cells) that can be enriched and/or selected are those defined by function, activation state, maturity, potential for differentiation, expansion, recirculation, localization, and/or persistence capacities, antigen-specificity, type of antigen receptor, presence in a particular organ or compartment, marker or cytokine secretion profile, and/or degree of differentiation. Among the sub-types and subpopulations of T cells and/or of CD4+ and/or of CD8+ T cells that can be enriched, isolated and/or selected are naïve T (TN) cells, effector T cells (TEFF), memory T cells and sub-types thereof, such as stem cell memory T (TSCM), central memory T (TCM), effector memory T (TEM), or terminally differentiated effector memory T cells, tumor-infiltrating lymphocytes (TIL), immature T cells, mature T cells, helper T cells, cytotoxic T cells, mucosa-associated invariant T (MAIT) cells, naturally occurring and adaptive regulatory T (Treg) cells, helper T cells, such as TH1 cells, TH2 cells, TH3 cells, TH17 cells, TH9 cells, TH22 cells, follicular helper T cells, alpha/beta T cells, and delta/gamma T cells.

In some embodiments, one or more of the T cell populations enriched and/or selected from a sample in cell samples provided herein are cells that are positive for (marker+) or express high levels (marker$^{high}$) of one or more particular markers, such as surface markers, or that are negative for (marker-) or express relatively low levels (marker$^{low}$) of one or more markers. In some cases, such markers are those that are absent or expressed at relatively low levels on certain populations of T cells (such as non-memory cells) but are present or expressed at relatively higher levels on certain other populations of T cells (such as memory cells). In one embodiment, the cells (such as the CD8+ cells or the T cells, e.g., CD3+ cells) are enriched for (i.e., positively selected for) cells that are positive or expressing high surface levels of CD45RO, CCR7, CD28, CD27, CD44, CD127, and/or CD62L and/or depleted of (e.g., negatively selected for) cells that are positive for or express high surface levels of CD45RA. In some embodiments, cells are enriched for or depleted of cells positive or expressing high surface levels of CD122, CD95, CD25, CD27, and/or IL7-Rα (CD127). In some examples, CD8+ T cells are enriched for cells positive for CD45RO (or negative for CD45RA) and for CD62L.

In some embodiments, a CD4+ T cell population and a CD8+ T cell sub-population, e.g., a sub-population enriched for central memory (TCM) cells.

In some embodiments, the cells are natural killer (NK) cells. In some embodiments, the cells are monocytes or granulocytes, e.g., myeloid cells, macrophages, neutrophils, dendritic cells, mast cells, eosinophils, and/or basophils.

In some embodiments, the source type of cells is an engineered population of cells that have been introduced, e.g., by gene transfer (e.g., transduction) with a nucleic acid encoding a recombinant protein. Examples of recombinant proteins to be expressed include recombinant receptors, such as chimeric antigen receptors (CARs) or T cell receptors (TCRs). Various methods for the introduction of genetically engineered components, e.g., recombinant receptors, e.g., CARs or TCRs, are well known and may be used with the provided methods and cell samples. Exemplary methods include those for transfer of nucleic acids encoding the recombinant protein, including via viral, e.g., retroviral or lentiviral, transduction, transposons, and electroporation. In some embodiments, the genetic engineering involves introduction of a nucleic acid encoding the recombinant or engineered component into a composition containing the cells, such as by retroviral transduction, transfection, or transformation. Introduction of the nucleic acid molecules encoding the recombinant protein, such as recombinant receptor, in the cell may be carried out using any of a number of known vectors. Such vectors include viral and non-viral systems, including lentiviral and gammaretroviral systems, as well as transposon-based systems such as PiggyBac or Sleeping Beauty-based gene transfer systems. Exemplary methods include those for transfer of nucleic acids encoding the receptors, including via viral, e.g., retroviral or lentiviral, transduction, transposons, and electroporation.

In some embodiments, the primary cell samples used as the source type of cells for each of the plurality of reference cell samples is from a different subject (e.g., patient), and each is different from the subject (e.g., patient) from which the source type of cells has been obtained (or is to be obtained as the case may be) for the test cell sample. In some embodiments, each different subject (e.g., patient) has the same or similar disease or condition. For instance, each different subject has the same cancer type. In some cases, the source type of cells may be samples from subjects (e.g., patient) having a disease or condition in which it is desired to carry out flow cytometry analysis on cells of the subject prior to or in the course of a certain therapy. In some cases, the reference cell samples may be samples from subjects from a clinical trial for testing of the particular therapy. In some embodiments, the source type of cells to be tested are cells of a cell therapy that is to be administered to the subject (e.g., patient). In some embodiments, the cell therapy is a CAR cell therapy (e.g., CAR T cells), a TCR cell therapy, a tumor infiltrating lymphocyte (TIL) cell therapy, a natural killer (NK) cell therapy or a stem cell therapy. With reference to the subject to be treated, the cells may be allogeneic and/or autologous. In some embodiments, the cell therapy is an autologous cell therapy. In some embodiments, the cells are pluripotent and/or multipotent, such as stem cells, such as induced pluripotent stem cells (iPSCs) or cells differentiated therefrom. In some cases, the reference cell samples may be samples of the cell therapy individually produced from a plurality of different subjects in a clinical trial, and the test cell sample is a sample of the cell therapy produced from a test subject (e.g., patient) identified for or approved for treatment with the particular cell therapy. In some embodiments, the provided methods can be carried out in connection with quality control or characterization of a produced, e.g., engineered, cell therapy prior to its introduction to a subject.

In particular embodiments, the source type of cells in the reference cell samples are cells that are known to, or suspected to, contain similar attributes or features of a test cell sample that is desired to be analyzed by the provided methods using a static gating threshold. Thus, in provided embodiments, the test cell sample, and the first and second reference cell samples, are from the same source of cells. For instance, if a test cell sample is a leukapheresis cell sample, then the source of cells in the reference cell samples also are a leukapheresis cell sample. In some embodiments, in instances where the cells are primary cells from a subject, the source of cells of the reference cell samples and the test cell sample also may be obtained or derived from subjects with similar attributes or features. For instance, in some embodiments, the test cell sample is derived from a subject with a disease and the reference cell populations samples are derived from other control subjects with the same or a similar disease. In some embodiments, the disease is cancer, or a particular type or subtype of cancer, such as a lymphoma, leukemia, myeloma, or a solid tumor cancer. In some embodiments, the test cell sample is a population of cells that has been manipulated, such as by genetic transfer (e.g., transduction) or gene editing procedures, or by exposure or incubation in the presence of a modulating agent, such as an activation agent, cytokine, immunomodulatory agent, small molecule compound or other agent that may alter one or more features or properties of the cells. In such embodiments, the reference cell samples also are a population of cells that has been similarly manipulated under the same conditions as the test cell sample (or as planned for the test cell sample as the case may be).

In some embodiments, the plurality of the first reference cell sample includes greater than 2 cell samples. In some embodiments, the plurality of the first reference cell sample includes greater than 5, 10, 25, 50, 100, 200, 300, 400, 500, 600, 700, 800, 900, or 1000 cell samples. In some embodiments, the plurality of the first reference cell sample includes between 100 and 500 cells sample, such as between 100 and 400 cell samples, between 100 and 300 cell samples, between 100 and 200 cell samples, between 200 and 500 cell samples, between 200 and 400 cell samples, between 200 and 300 cell samples, between 300 and 500 cell samples, between 300 and 400 cell samples or between 400 and 500 cell samples. In some embodiments, each of the first reference cell sample is an unlabeled population of cells in which such cells have not been stained with or exposed to any fluorescent marker such that the cells are not labeled with any fluorescent signal. In some embodiments, the plurality of the first cell samples represent a population of unstained cells that can serve as a background control to account for negative staining or autofluorescence of cells in a sample.

In some embodiments, the plurality of the second reference cell sample includes greater than 2 cell samples. In some embodiments, the plurality of the second reference cell sample includes greater than 5, 10, 25, 50, 100, 200, 300, 400, 500, 600, 700, 800, 900, or 1000 cell samples. In some embodiments, the plurality of the second reference cell sample includes between 100 and 500 cells sample, such as between 100 and 400 cell samples, between 100 and 300 cell samples, between 100 and 200 cell samples, between 200 and 500 cell samples, between 200 and 400 cell samples, between 200 and 300 cell samples, between 300 and 500 cell samples, between 300 and 400 cell samples or between 400 and 500 cell samples. In some embodiments, a portion of the source of cells that is the same as the first reference cell sample (the unlabeled or unstained cell sample) is used as the starting source of cells for each of the respective second reference cell sample. Thus, in provided embodiments, each of the plurality of second reference population of cells are derived from one of the plurality of the first reference population of cells.

In some embodiments, the second reference sample is subjected to labeling procedures by individually contacting each of the cell samples of the plurality of second reference cell samples with one or more staining reagent. For practice of the provided methods, the test sample and each of the second reference sample is subjected to cell staining with one or more staining reagents for labeling the cell with the one or more fluorescent signal. In some embodiments, the staining reagent can be any reagent as described in Section I. In some embodiments, the cell staining procedure can be carried out with any method as described in Section I. In provided embodiments, the binding agent specific to a particular marker and dye are chosen such that staining of cells with the staining reagent results in a clear separation between positive and negative/unstained populations for the particular marker attribute. For instance, it is understood that the provided methods may not be suitable for attributes that are not amenable to clear separation between positive and negative stained samples.

In provided embodiments, the cell staining of the test cell sample and each of the second reference cell sample is carried out with the same staining reagent(s) and using the same protocol conditions. It is understood that reference to the "same" does not mean that the staining reagent or the protocol is identical in all respects as some variability among reagents or in carrying out a protocol is expected. It is within the level of a skilled artisan to ensure procedures are taken to ensure variability is minimized and that the procedures are as similar as possible. For instance, it is not necessary that the staining be carried out with the exact same lot or batch of a staining reagent, for example as available from a commercial provider. Typically, each manufactured batch or lot of a staining reagent is characterized so that its mean fluorescence intensity (MFI) is matched to one or more prior lots or batches of the same staining reagent. In some embodiments, cell staining is carried out using a staining reagent known to have the same protein sequence or chemical structure, including the same fluorophore type. Typically, a staining reagent is a reagent obtained from the same commercial vendor or supplier, such as sold under the same catalog number.

In some embodiments, cells are stained with multiple staining reagents against multiple markers, such as cell surface markers. In some embodiments, this results in labeled cells with multiple markers, allowing for the characterization of well-defined subsets of cells. Thus, in some embodiments, the cell staining is a multi-color cell staining for labeling the cells with two or more different fluorescent signals, wherein each staining reagent labels a different marker with a different fluorescent signal. In some embodiments, the two or more different fluorescent signals comprise 2 to 10 fluorescent signals. In some embodiments, the cell staining is carried out to label cells with 2 different fluorescent signals. In some embodiments, the cell staining is carried out to label cells with 3 different fluorescent signals. In some embodiments, the cell staining is carried out to label cells with 4 different fluorescent signals. In some embodiments, the cell staining is carried out to label cells with 5 different fluorescent signals. In some embodiments, the cell staining is carried out to label cells with 6 different fluorescent signals. In some embodiments, the cell staining is carried out to label cells with 7 different fluorescent signals. In some embodiments, the cell staining is carried out to label cells with 8 different fluorescent signals. In some embodiments, the cell staining is carried out to label cells with 9 different fluorescent signals. In some embodiments, the cell staining is carried out to label cells with 10 different fluorescent signals. In some embodiments, each of the two or more different fluorescent signals has a different emission spectra. In some embodiments, each of the two or more different fluorescent signals has a peak emission spectra of the fluorescent signal that does not overlap with the one or more other fluorescent signals in the cell staining. In some embodiments, the cell staining is carried out with a staining reagent in which the two or more different fluorescent signals is emitted by a dye selected from PE-Cy7, APC, AF700, BV421, Aqua, or BV605.

In some embodiments, the cell staining involves incubation with a staining reagent, e.g., antibody or binding partner conjugated to a fluorophore dye, that specifically binds to such markers, in some embodiments followed by washing steps and separation of cells having bound the staining reagent, from those cells having not bound to the antibody or binding partner. In some aspects of such processes, a volume of cells is mixed with an amount of a desired staining reagent and incubated under conditions for staining of the cells. In some embodiments, the staining or labelling is carried out at a temperature between 0° C. and 25° C., such as at or about 4° C. In some embodiments, the staining or labelling is carried out for greater than 5 minutes, typically greater than 15 minutes. In some embodiments, the staining or labelling is carried out for between 15 minutes and 6 hours, such as between 30 minutes and 2 hours. In some embodiments, the staining or labelling is carried out for example, at or about 15 minutes, 30 minutes, 1 hour, 1.5 hours, 2 hours, 2.5 hours, 3 hours, or any value between any of the foregoing. In some embodiments, the labeling with the one or more staining reagents is carried out simultaneously. In some embodiments, one or more wash steps are carried out prior to introducing the sample into the flow cytometer for analysis.

In some embodiments, each of the cell samples, e.g., each of the plurality of first and second reference cell sample, is individually prepared by suspending single cells at a density of $1 \times 10^6$ to $1 \times 10^7$ cells/ml in order to allow the cells to pass through the flow cytometer for reading. In some embodiments, this concentration of cells is called the fluid sheath. In some embodiments, the fluid sheath influences the rate of flow sorting, which typically progresses at around 2,000-20,000 cells per second. The cell sample's fluid sheath is typically made of a phosphate buffered saline solution, but other solutions are available as will be known and understood by those skilled in the art.

In some embodiments, flow cytometry was carried out on a single cell sample for each of the plurality of first reference cell samples.

In some embodiments, cell staining can be repeated a number of times, such as in duplicate or triplicate, for each of the source type of cells stained for labeling with the one or more fluorescent signals resulting in duplicate or triplicate stained samples. In some embodiment, the plurality of second reference cell samples include duplicate samples of the same stained cells. In some embodiments, the plurality of second reference cell samples include triplicate samples of the same stained cells.

In some embodiments, prior to running samples on a flow cytometer, one or more of alignment, compensation and calibration of the flow cytometer is carried out. Alignment, compensation, and calibration ensure that the instrument will operate at its maximum efficiency, as well as achieving reproducibility such that data taken over time or with various instruments will be comparable.

In some embodiments, alignment is the process of adjusting and focusing the various optical and electrical components such that scatter and fluorescence signals are tuned to their highest intensity and tightest distribution, i.e., lowest coefficient of variation<CV) of the distribution. The components of the flow cytometer to be aligned include the laser, lenses, mirrors, barrier filters, and PMTs.

In some cases, multi-fluorescence analysis, i.e., analysis using two or more fluorescent dyes simultaneously, can be performed on a flow cytometer. However, to perform accurate analysis, it is necessary to adjust the electrical compensation circuits in the flow cytometer such that any fluorescence emission which overlaps into other fluorescence channels may be subtracted from such other channels. Compensation is the process of electronically removing residual signals from fluorescent dyes in secondary fluorescence channels due to spectral overlaps not removed by the barrier filters for the respective channels. Calibration of a flow cytometer with proper standards ensures that the results from samples will be comparable over time and between different instruments. For the calibration of the intensity of fluorescence signals to be independent of the specific instrument and instrument settings, the excitation and emission spectra of the calibration standards and of the samples being measured must be equivalent and the measurements on each must be made under the same instrument settings. Methods for calibration of a flow cytometer are known and are described, for example, in U.S. Pat. Nos. 4,714,682; 4,767, 206; 4,774,189; and 5,620,842 and International Published PCT Appl. No. WO1991000509. In some embodiments, methods for calibration make use of both blank and fluorescently labelled microbeads which may be used to align and calibrate the fluorescent channels of a flow cytometer. For example, U.S. Pat. Nos. 4,774,189 and 4,767,206 describe a method for using such microbeads to calibrate a flow cytometer. In some embodiments, the standard used for calibration mimics the cells to be studied in a sample, for example, as described in U.S. Pat. No. 6,008,052.

In some embodiments, fluorescence calibration ensures accuracy and reproducibility of the provided methods. In some embodiments, In order to obtain accurate and reproducible results, flow cytometers must be aligned and calibrated. When operating with more than one fluorescent dye, the instrument also requires compensation for the fluorescence photomultiplier tubes (PMTs).

In some embodiments, each of the cell samples, e.g., each of the plurality of first and second reference cell sample, is individually introduced into a flow cytometer. Both front scatter light and side scatter light are unique for every particle passing through the flow cytometer, and a combination of all can be used to differentiate particles in the cell sample. In some embodiments, forward scatter light, side scattered light and emitted light signals are converted to electronic pulses that are processed by the flow cytometry engine and provided as flow cytometry data. In some embodiments, the flow cytometry data is displayed on a graphical user interface "GUI."

In some embodiments, the flow cytometry data from each of the plurality of first reference cells samples and each of the plurality of second reference cell samples is used to set a static threshold gate. In some embodiments, the setting a static fluorescence threshold gate comprises setting a static fluorescence threshold gate for each of the one or more fluorescent signal. In some embodiments, the static threshold gate is a fixed threshold chosen to distinguish positive from negative staining for each of the one or more fluorescent signal (see FIG. 1A). In some embodiments, for each of the one or more fluorescent signal, the static gate threshold is set by (1) determining the upper fluorescence boundary of the fluorescent signal from each of the unstained samples from the plurality of first reference samples; (2) determining the lower boundary of fluorescence of the fluorescent signal from each of the stained samples from the plurality of second reference samples; and (3) setting a fixed or static threshold for each fluorescent signal as a threshold gate for the fluorescent signal. In some embodiments, determining the upper boundary of each of the fluorescent signals can be determined as an upper percentile (e.g., $90^{th}$ percentile or greater) according to the distribution of the fluorescent signal in the unstained samples from the plurality of the first reference samples. In some embodiments, determining the lower boundary of each of the fluorescent signals can be determined as a lower percentile (e.g., $10^{th}$ percentile or less) according to the distribution of the fluorescent signal in the stained samples from the plurality of the second reference samples.

In some embodiments, setting a static fluorescence threshold gate for each of the one or more fluorescent signal is such that for each fluorescent signal the threshold gate: (i) is greater than the $90^{th}$ percentile of fluorescence of the plurality of the first reference population of cells for the respective fluorescent signal of each of the one or more fluorescent signal; and (ii) is less than the $10^{th}$ percentile of fluorescence of the plurality of the second reference population of cells for the same respective fluorescent signal.

Thus, among the provided herein are methods of determining a static fluorescence threshold gate, comprising: (1) measuring cytometry events by flow cytometry for one or more fluorescent signals for a plurality of at least two reference cell samples, the plurality of at least two reference cell samples comprising: (a) a plurality of a first reference cell sample each comprising a population of unstained cells that have not been labeled with the one or more fluorescent signals; and (b) a plurality of a second reference cell samples, wherein each of the plurality of second reference cell samples are derived from the same source type of cells as the one of the plurality of the first reference cell samples, and wherein each of the plurality of second reference cell samples include at least one population of stained cells that have been labeled with at least one of the one or more fluorescent signals; and (2) setting a static fluorescence threshold gate for each of the one or more fluorescent signal, such that each fluorescent signal threshold gate: (a) is a greater than the $90^{th}$ percentile of fluorescence of the plurality of the first reference population of cells for the respective fluorescent signal of each of the one or more fluorescent signal; and (b) is less than the $10^{th}$ percentile of fluorescence of the plurality of the second reference population of cells for the same respective fluorescent signal.

In some embodiments, for each fluorescent signal, the static fluorescence threshold gate is a fluorescence of the fluorescent signal that is greater than the $90^{th}$, $91^{st}$, $92^{nd}$, $93^{rd}$, $94^{th}$, $95^{th}$, $96^{th}$, $97^{th}$, $98^{th}$, or $99^{th}$ percentile of fluorescence among the plurality of the first reference population of cells for the respective fluorescent signal. In some embodiments, for each fluorescent signal, the static fluorescence threshold gate is a fluorescence of the fluorescent signal that is greater than the $90^{th}$, $91^{st}$, $92^{nd}$, $93^{rd}$, $94^{th}$, or $95^{th}$ percentile of fluorescence among the plurality of the first reference population of cells for the respective fluorescent signal.

In some embodiments, for each fluorescent signal, the static fluorescence threshold gate is a fluorescence of the fluorescent signal that is greater than the $95^{th}$, $96^{th}$, $97^{th}$, $98^{th}$, or $99^{th}$ percentile of fluorescence among the plurality of the first reference population of cells for the respective fluorescent signal.

In some embodiments, for each fluorescent signal, the static fluorescence threshold gate is a fluorescence of the fluorescent signal that is less than the $10^{th}$, $9^{th}$, $8^{th}$, $7^{th}$, $6^{th}$, $5^{th}$, $4^{th}$, $3^{rd}$, $2^{nd}$ or $1^{st}$ percentile of fluorescence among the plurality of the second reference population of cells for the respective fluorescent signal. In some embodiments, for each fluorescent signal, the static fluorescence threshold gate is a fluorescence of the fluorescent signal that is less than the $5^{th}$, $4^{th}$, $3^{rd}$, $2^{nd}$ or $1^{st}$ percentile of fluorescence among the plurality of the second reference population of cells for the same respective fluorescent signal.

In some embodiments, for each fluorescent signal, the static fluorescence threshold gate is a fluorescence of the fluorescent signal that is greater than the $90^{th}$, $91^{st}$, $92^{nd}$, $93^{rd}$, $94^{th}$, $95^{th}$, $96^{th}$, $97^{th}$, $98^{th}$, or $99^{th}$ percentile of fluorescence among the plurality of the first reference population of cells for the respective fluorescent signal; and is less than the $10^{th}$, $9^{th}$, $8^{th}$, $7^{th}$, $6^{th}$, $5^{th}$, $4^{th}$, $3^{rd}$, $2^{nd}$ or $1^{st}$ percentile of fluorescence among the plurality of the second reference population of cells for the same respective fluorescent signal.

In some embodiments, for each fluorescent signal, the static fluorescence threshold gate is a fluorescence of the fluorescent signal that is greater than the $90^{th}$, $91^{st}$, $92^{nd}$, $93^{rd}$, $94^{th}$, or $95^{th}$ percentile of fluorescence among the plurality of the first reference population of cells for the respective fluorescent signal; and is less than the $5^{th}$, $4^{th}$, $3^{rd}$, $2^{nd}$ or $1^{st}$ percentile of fluorescence among the plurality of the second reference population of cells for the same respective fluorescent signal.

In some embodiments, for each fluorescent signal, the static fluorescence threshold gate is a fluorescence of the fluorescent signal that is greater than the $95^{th}$, $96^{th}$, $97^{th}$, $98^{th}$, or $99^{th}$ percentile of fluorescence among the plurality of the first reference population of cells for the respective fluorescent signal; and is less than the $5^{th}$, $4^{th}$, $3^{rd}$, $2^{nd}$ or $1^{st}$ percentile of fluorescence among the plurality of the second reference population of cells for the same respective fluorescent signal.

In some embodiments, the static fluorescence threshold gate for at least one fluorescent signal is a fluorescence that is greater than the $95^{th}$ percentile of fluorescence among the plurality of the first reference cell sample for the fluorescent signal. In some embodiments, the static fluorescence threshold gate for at least one of the one or more fluorescent signal is a fluorescence that is greater than the $96^{th}$ percentile of fluorescence among the plurality of the first reference cell sample for the fluorescent signal. In some embodiments, the static fluorescence threshold gate for at least one of the one or more fluorescent signal is a fluorescence that is greater than the $97^{th}$ percentile of fluorescence among the plurality of the first reference cell sample for the fluorescent signal. In some embodiments, the static fluorescence threshold gate for at least one of the one or more fluorescent signal is a fluorescence that is greater than the $98^{th}$ percentile of fluorescence among the plurality of the first reference cell sample for the fluorescent signal. In some embodiments, the static fluorescence threshold gate for at least one of the one or more fluorescent signal is a fluorescence that is greater than the $99^{th}$ percentile of fluorescence among the plurality of the first reference cell sample for the fluorescent signal. In some embodiments, the static fluorescence threshold gate for at least one of the one or more fluorescent signal is a fluorescence that is about at or greater than all percentiles of fluorescence among the plurality of the first reference cell sample for the fluorescent signal.

In some embodiments, the static fluorescence threshold gate for at least one of the one or more fluorescent signal is a fluorescence that is less than the 5th percentile of fluorescence among the plurality of the second reference cell sample for the fluorescent signal. In some embodiments, the static fluorescence threshold gate for at least one of the one or more fluorescent signal is a fluorescence that is less than the 4th percentile of fluorescence among the plurality of the second reference cell sample for the fluorescent signal. In some embodiments, the static fluorescence threshold gate for at least one of the one or more fluorescent signal is a fluorescence that is less than the 3rd percentile of fluorescence among the plurality of the second reference cell sample for the fluorescent signal. In some embodiments, the static fluorescence threshold gate for at least one of the one or more fluorescent signal is a fluorescence that is less than the 2nd percentile of fluorescence among the plurality of the second reference cell sample for the fluorescent signal. In some embodiments, the static fluorescence threshold gate for at least one of the one or more fluorescent signal is a fluorescence that is less than the 1st percentile of fluorescence among the plurality of the second reference cell sample for the fluorescent signal. In some embodiments, the static fluorescence threshold gate for at least one of the one or more fluorescent signal is a fluorescence that is less than all percentiles of fluorescence among the plurality of the second reference cell sample for the fluorescent signal.

In some embodiments, the static fluorescence threshold gate for at least one of the one or more fluorescent signal is a fluorescence that is greater than the $90^{th}$ percentile of fluorescence among the plurality of the first reference population of cells for the respective fluorescent signal, and, is less than the $10^{th}$ percentile of fluorescence among the plurality of the second reference population of cells for the same respective fluorescent signal.

In some embodiments, the static fluorescence threshold gate for at least one of the one or more fluorescent signal is a fluorescence that is greater than the $95^{th}$ percentile of fluorescence among the plurality of the first reference population of cells for the respective fluorescent signal, and, is less than the $5^{th}$ percentile of fluorescence among the plurality of the second reference population of cells for the same respective fluorescent signal.

In some embodiments, the static fluorescence threshold gate for at least one of the one or more fluorescent signal is a fluorescence that is greater than the $99^{th}$ percentile of fluorescence among the plurality of the first reference population of cells for the respective fluorescent signal, and, is less than the 1st percentile of fluorescence among the plurality of the second reference population of cells for the same respective fluorescent signal.

It is within the level of a skilled artisan to choose a particular static fluorescence threshold gate for a particular fluorescent signal. Factors to consider in choosing a static fluorescence threshold gate include the degree of acceptable false positives or false negatives in a stained sample. In particular embodiments, a static fluorescence threshold gate is chosen to exclude the unstained or negative population entirely. In some embodiments, a static fluorescence threshold gate is chosen to include as much of the positive population as possible, except, in some cases, statistical outliers. In some embodiments, a static fluorescence gate threshold is set conservatively on the positive population (e.g., less than the $1^{st}$ percentile or less than all percentiles among the plurality of the second reference population) when there is a wide range between positive and negative/unstained fluorescence. In some embodiments, a wide range in fluorescence of a fluorescence signal exists if the fluorescence positive and unstained/negative population of cells differs by more than 2-fold, such as more than 3-fold, 4-fold, 5-fold, 6-fold, 7-fold, 8-fold, 9-fold, 10-fold or more. In some embodiments, a wide range in fluorescence of a fluorescence signal exists if the fluorescence positive and unstained/negative population of cells differs by more than 5-fold. In some embodiments, a wide range in fluorescence of a fluorescence signal exists if the fluorescence positive and unstained/negative population of cells differs by more than 10-fold.

In some embodiments, for low prevalence attributes (e.g., less than 5% expected frequency of cells positive for an attribute among a population of cells) additional mean fluorescence intensity (MFI) analyses can be used to aid in threshold determination. In such example, the percentile information as described (e.g., 99th and 1st percentile of fluorescence among a plurality of first reference samples and a plurality of second reference samples, respectively) are informative and help determine the boundaries or edges of a populations but in some cases may be skewed by rare events or outliers in a population that has few events to begin with as the case may be for low prevalence attributes. The MFI is a median measurement and is less susceptible to skewing from outliers. Thus, in some embodiments, MFI can be used as a tertiary analysis. In some embodiments, the MFI can be used to identify the center or densest part of the low prevalence populations. In some embodiments, once the center of the positive/stained and negative/unstained populations are determined based on the MFI, and the edges of the difference populations are determined based on percentiles (e.g., $99^{th}$ percentile of fluorescence among the first reference cell samples and $1^{st}$ percentile of fluorescence among the second reference cell samples), a threshold can be set to separate the two populations. It is within the level of a skilled artisan to set the threshold in consideration of the MFI for a particular fluorescence signal.

In some embodiments, a set fluorescence determined to be a static fluorescence gate threshold according to any of the provided embodiments can be rounded to an even number on a logarithmic flow axis. In some embodiments, choosing an even number may optimize workflow. In some embodiments, for each of the one or more fluorescent signals, the static fluorescence threshold gate is rounded to the nearest 10, is rounded to the nearest 100, or is rounded to the nearest 1,000, on a logarithmic flow axis.

B. Applying Static Gating Thresholds and Identifying Cells

In some embodiments, the provided methods comprise applying, to flow cytometry data comprising a plurality of cytometry events from the test population, the static fluorescence threshold gate for each of the one or more fluorescent signals as described herein, e.g., in Section II, Part A.

Among methods provided herein are methods of applying a static fluorescence threshold gate using flow cytometry, comprising: (1) receiving flow cytometry data comprising a plurality of cytometry events from a test population of labeled cells sorted according to one or more fluorescent signals measured by a flow cytometer; and (2) applying a static fluorescence threshold gate individually to each of the one or more fluorescent signals, according to any of the provided methods for setting a static fluorescence threshold gate.

For instance, provided herein are methods of applying a static fluorescence threshold gate using flow cytometry, comprising: (1) receiving flow cytometry data comprising a plurality of cytometry events from a test population of labeled cells sorted according to one or more fluorescent signals measured by a flow cytometer; (2) applying a static fluorescence threshold gate individually to each of the one or more fluorescent signals, wherein the static fluorescence threshold gate for each of the one or more fluorescent signals is determined from: (a) cytometry events measured by flow cytometry for the one or more fluorescent signals for a plurality of at least two reference populations of cells each sorted according to the one or more fluorescent signals, the plurality of at least two reference populations comprising: (i) a plurality of a first reference population of cells each comprising a population of unstained cells that have not been labeled with the one or more fluorescent signals; and (ii) a plurality of a second reference population of cells, wherein each of the plurality of second reference population of cells are derived from one of the plurality of the first reference population of cells, and wherein each of the plurality of second reference population of cells comprise at least one population of stained cells that have been labeled with at least one of the one or more fluorescent signals; and (b) setting a static fluorescence threshold gate for each of the one or more fluorescent signals, such that for each fluorescent signal it: (i) is greater than the $90^{th}$ percentile of fluorescence of the plurality of the first reference population of cells for the respective fluorescent signal of each of the one or more fluorescent signal; and (ii) is less than the $10^{th}$ percentile of fluorescence of the plurality of the second reference population of cells for the same respective fluorescent signal.

In some embodiments, the provided methods further comprise, for each of the one or more fluorescent signals, identifying a subset of cytometry events from the test population of cells that have a fluorescence signal above the static threshold gate.

Also provided herein are methods of selecting a subset of cytometry events from flow cytometry data, comprising: (1) receiving flow cytometry data comprising a plurality of cytometry events from a test population of labeled cells sorted according to one or more fluorescent signals measured by a flow cytometer; (2) applying a static fluorescence threshold gate individually to each of the one or more fluorescent signals, wherein the static fluorescence threshold gate for each of the one or more fluorescent signals is determined from: (a) cytometry events measured by flow cytometry for the one or more fluorescent signals for a plurality of at least two reference populations of cells each sorted according to the one or more fluorescent signals, the plurality of at least two reference populations comprising: (i) a plurality of a first reference population of cells each comprising a population of unstained cells that have not been labeled with the one or more fluorescent signals; and (ii) a plurality of a second reference population of cells, wherein each of the plurality of second reference population of cells are derived from one of the plurality of the first reference population of cells, and wherein each of the plurality of second reference population of cells comprise at least one population of stained cells that have been labeled with at least one of the one or more fluorescent signal; and (b) setting a static fluorescence threshold gate for each of the one or more fluorescent signal such that for each fluorescent signal it: (i) is greater than the $90^{th}$ percentile of fluorescence of the plurality of the first reference population of cells for the respective fluorescent signal of each of the one or more fluorescent signal; and (ii) is less than the $10^{th}$ percentile of fluorescence of the plurality of the second reference population of cells for the same respective fluorescent signal; and (3) for each of the one or more fluorescent signals, identifying a subset of cytometry events from the test population of cells that have a fluorescence signal above the static threshold gate.

In some embodiments of the provided methods, the fluorescence features or characteristics of the identified subset of cells for at least one of the fluorescent signals is determined. In some embodiments, the fluorescence features or characteristics of the identified subset of cells for each of the one or more fluorescent signals is determined.

In some embodiments, for the identified subset of cytometry events for at least one of the one or more fluorescent signal, the method further comprises assessing the fluorescence intensity of the at least one fluorescent signal of the identified subset of cytometry events. In some embodiments, for each of the identified subset of cytometry events for each of the one or more fluorescent signal, the method further comprises assessing the intensity of the fluorescent signal of the identified subset of cytometry events. In some embodiments, the fluorescence intensity is the mean fluorescence intensity.

In some embodiments, for the identified subset of cytometry events for at least one of the one or more fluorescent signal, the method further comprises determining the percentage of the identified subset of cytometry events compared to the total number of collected cytometry events. In some embodiments, for each of the identified subset of cytometry events for each of the one or more fluorescent signal, the method further comprises determining the percentage of the identified subset of cytometry events for the respective fluorescent signal compared to the total number of collected cytometry events.

III. DEFINITIONS

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" include plural referents unless the context clearly dictates otherwise. For example, "a" or "an" means "at least one" or "one or more." It is understood that aspects and variations described herein include "consisting" and/or "consisting essentially of" aspects and variations.

The terms "at least on" and "one or more" may be understood to include any integer number greater than or equal to one, i.e. one, two, three, four, [ . . . ], etc. The term "a plurality" may be understood to include any integer number greater than or equal to two, i.e. two, three, four, five, [ . . . ], etc.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

The term "about" as used herein refers to the usual error range for the respective value readily known. Reference to "about" a value or parameter herein includes (and describes) embodiments that are directed to that value or parameter per se. For example, description referring to "about X" includes description of "X".

As used herein, an "event" or "cytometry event" refers to the data measured from a single particle, such as cells or synthetic particles, by a flow cytometer. Typically, the data measured from a single particle includes a number of parameters, including one or more light scattering parameters, and at least one fluorescence signal parameters. Thus, each event is represented as a vector of parameter measurements, wherein each measured parameter corresponds to one dimension of the data space.

A "fluorescent marker" or "fluorescence marker" refers to a fluorescent marker, including a fluorophore, that is capable of absorbing energy at a wavelength range and releasing energy at a wavelength range other than the absorbance range. Thus, it refers to a fluorescent compound that can emit light upon excitation by light. It is understood that the term "fluorescent marker" or variations thereof can be used interchangeably with the term "fluorophore." The term "excitation wavelength" refers to the range of wavelengths at which a fluorophore absorbs energy. The term "emission wavelength" refers to the range of wavelength that the fluorophore releases energy or fluoresces.

As used herein, "fluorescence" or "fluorescent intensity," which are terms that can be used interchangeably, refer to the output of a detection system that measures the fluorescence radiance from a fluorescing sample intensity of emission of a particular florescent signal, such as emitted from a fluorescent marker, such as a fluorophore. A fluorescent intensity is how much light (photons) is emitted by the fluorescent marker after it has absorbed light or other electromagnetic radiation.

As used herein, a "mean fluorescent intensity" or "MFI" refers to the mean of the fluorescence intensity in a particular fluorescent channel.

As used herein, a "gate" refers to a set of boundary points identifying a subset of data of interest. In cytometry, a gate may bound a group of events of particular interest. In some embodiments, a gate may be a window surrounding particular events. In other embodiments, a gate may be a "threshold gate." As used herein, "gating" refers to the process of defining a gate for a given set of data.

As used herein, a "threshold gate" refers to a gate that is set at a particular fluorescent intensity that separates cells of a cell population that emit a fluorescent signal or fluorescent intensity above that particular fluorescent intensity from cells of a cell population that emit a fluorescent signal or fluorescent intensity below that particular fluorescent intensity. Thus, in some embodiments, it defines an open region within the multidimensional space.

As used herein, a "static threshold gate" refers to a threshold gate that is fixed or unchanged for a given fluorescent signal and can be applied to a plurality of stained or labeled samples. In some embodiments, a static threshold gate is set for each attribute (e.g., marker) labeled with a fluorescent signal in a flow cytometry assay, e.g., multi-color flow cytometry assay.

As used herein "labeled" refers to a state in which a detectable label, such as a fluorescent marker or stain, is attached. For instance, cells of a cell population can be labeled with one or more fluorescent markers such that one or more fluorescent signals can be measured by a flow cytometer.

As used herein "percentile" refers to a score at or below which a given percentage of scores in its frequency distribution fall.

As used herein, reference to an "enriched" population of cells refers to one or more particular cell type or subset or cell population that have been subjecting to an enriching, isolation or selection step to increase the number or percentage of the cell type or population, e.g., compared to their percentage in a starting population of cells. Hence, it refers to increasing the percentage or frequency of such cells, or relative to other cell types, such as by positive selection based on markers expressed by the population or cell, or by negative selection based on a marker not present on the cell population or cell to be depleted. The term does not require complete removal of other cells, cell type, or populations from the composition and does not require that the cells so enriched be present at or even near 100% in the enriched composition. In some embodiments, an enriched population of cells contains greater than 50%, 60%, 70%, 80%, 90%, 95% or more of a particular cell type or subset. For instance, an enriched population of cells may be an enriched T cell population containing greater than 50%, 60%, 70%, 80%, 90%, 95% or more T cells (e.g., CD3+ cells) or a CD4+ or CD8+ subset thereof. Reference to positive selection of or enrichment for cells of a particular type, such as those expressing a marker, refers to increasing the number or percentage of such cells, but need not result in a complete absence of cells not expressing the marker. Likewise, negative selection, removal, or depletion of cells of a particular type, such as those expressing a marker, refers to decreasing the number or percentage of such cells, but need not result in a complete removal of all such cells. For example, in some aspects, a selection of one of the CD4+ or CD8+ population enriches for said population, either the CD4+ or CD8+ population, but also can contain some residual or small percentage of other non-selected cells, which can, in some cases, include the other of the CD4 or CD8 population still being present in the enriched population.

As used herein, a statement that a cell or population of cells is "positive" for a particular marker refers to the detectable presence on or in the cell of a particular marker, typically a surface marker. When referring to a surface marker, the term refers to the presence of surface expression as detected by flow cytometry, for example, by staining with an antibody that specifically binds to the marker and detecting said antibody, wherein the staining is detectable by flow cytometry at a level substantially above the staining detected carrying out the same procedure with an isotype-matched control under otherwise identical conditions and/or at a level substantially similar to that for cell known to be positive for the marker, and/or at a level substantially higher than that for a cell known to be negative for the marker.

As used herein, a statement that a cell or population of cells is "negative" for a particular marker refers to the absence of substantial detectable presence on or in the cell of a particular marker, typically a surface marker. When referring to a surface marker, the term refers to the absence of surface expression as detected by flow cytometry, for example, by staining with an antibody that specifically binds to the marker and detecting said antibody, wherein the staining is not detected by flow cytometry at a level substantially above the staining detected carrying out the same procedure with an isotype-matched control under otherwise identical conditions, and/or at a level substantially lower than that for cell known to be positive for the marker, and/or at a level substantially similar as compared to that for a cell known to be negative for the marker.

As used herein, a "subject" is a mammal, such as a human or other animal, and typically is human.

IV. EXEMPLARY EMBODIMENTS

Among the provided embodiments are:
1. A method of determining a static fluorescence threshold gate, the method comprising:
   (1) measuring cytometry events by flow cytometry for one or more fluorescent signals for a plurality of at least two reference cell samples, the plurality of the at least two reference cell samples comprising:
      (a) a plurality of a first reference cell sample each comprising a population of unstained cells that have not been labeled with the one or more fluorescent signals; and
      (b) a plurality of a second reference cell sample, wherein each of the plurality of second reference cell sample are derived from the same source type of cells as one of the plurality of the first reference cell sample, and wherein each of the plurality of second reference cell sample comprise at least one population of stained cells that have been labeled with at least one of the one or more fluorescent signals; and
   (2) setting a static fluorescence threshold gate for each of the one or more fluorescent signal, such that for each fluorescent signal the threshold gate is a fluorescence that:
      (a) is greater than the $90^{th}$ percentile of fluorescence of the plurality of the first reference cell sample for the respective fluorescent signal of each of the one or more fluorescent signal; and (b) is less than the $10^{th}$ percentile of fluorescence of the plurality of the second reference cell sample for the same respective fluorescent signal.

2. A method of selecting a subset of cytometry events from flow cytometry data, the method comprising:

(1) receiving flow cytometry data comprising a plurality of cytometry events from a test cell sample comprising labeled cells sorted according to one or more fluorescent signals measured by a flow cytometer;

(2) applying a static fluorescence threshold gate individually to each of the one or more fluorescent signals, wherein the static fluorescence threshold gate for each of the one or more fluorescent signals is determined according to the method of embodiment 1; and (3) for each of the one or more fluorescent signals, identifying a subset of cytometric events that have a fluorescence signal above the static threshold gate.

3. A method of selecting a subset of cytometry events from flow cytometry data, comprising:

(1) receiving flow cytometry data comprising a plurality of cytometry events from a test cell sample comprising labeled cells sorted according to one or more fluorescent signals measured by a flow cytometer;

(2) applying a static fluorescence threshold gate individually to each of the one or more fluorescent signals, wherein the static fluorescence threshold gate for each of the one or more fluorescent signals is determined from:

(a) cytometry events measured by flow cytometry for the one or more fluorescent signals for a plurality of at least two reference cell samples each sorted according to the one or more fluorescent signals, the plurality of the at least two reference cell samples comprising:

(i) a plurality of a first reference cell sample each comprising a population of unstained cells that have not been labeled with the one or more fluorescent signals; and (ii) a plurality of a second reference cell sample, wherein each of the plurality of second reference cell sample are derived from the same source type of cells as one of the plurality of the first reference cell sample, and wherein each of the plurality of second reference cell sample comprise at least one population of stained cells that have been labeled with at least one of the one or more fluorescent signal; and (b) setting a static fluorescence threshold gate for each of the one or more fluorescent signal such that for each fluorescent signal the threshold gate is a fluorescence that:

(i) is greater than the $90^{th}$ percentile of fluorescence of the plurality of the first reference cell sample for the respective fluorescent signal of each of the one or more fluorescent signal; and (ii) is less than the $10^{th}$ percentile of fluorescence of the plurality of the second reference cell sample for the same respective fluorescent signal; and (3) for each of the one or more fluorescent signals, identifying a subset of cytometric events that have a fluorescence signal above the static threshold gate.

4. A method of applying a static fluorescence threshold gate using flow cytometry, comprising:

(1) receiving flow cytometry data comprising a plurality of cytometry events from a test cell sample comprising labeled cells sorted according to one or more fluorescent signals measured by a flow cytometer; and (2) applying a static fluorescence threshold gate individually to each of the one or more fluorescent signals, wherein the static fluorescence threshold gate for each of the one or more fluorescent signals is determined according to the method of embodiment 1.

5. A method of applying a static fluorescence threshold gate using flow cytometry, comprising:

(1) receiving flow cytometry data comprising a plurality of cytometry events from a test cell sample comprising labeled cells sorted according to one or more fluorescent signals measured by a flow cytometer;

(2) applying a static fluorescence threshold gate individually to each of the one or more fluorescent signals, wherein the static fluorescence threshold gate for each of the one or more fluorescent signals is determined from:

(a) cytometry events measured by flow cytometry for the one or more fluorescent signals for a plurality of at least two reference cell samples each sorted according to the one or more fluorescent signals, the plurality of at least two reference cell samples comprising:

(i) a plurality of a first reference cell sample each comprising a population of unstained cells that have not been labeled with the one or more fluorescent signals; and (ii) a plurality of a second reference cell sample, wherein each of the plurality of second reference cell sample are derived from the same source type of cells as one of the plurality of the first reference cell sample, and wherein each of the plurality of second reference cell sample comprise at least one population of stained cells that have been labeled with at least one of the one or more fluorescent signals; and (b) setting a static fluorescence threshold gate for each of the one or more fluorescent signals, such that for each fluorescent signal the threshold gate is a fluorescence:

(i) is greater than the $90^{th}$ percentile of fluorescence of the plurality of the first reference cell sample o for the respective fluorescent signal of each of the one or more fluorescent signal; and (ii) is less than the $10^{th}$ percentile of fluorescence of the plurality of the second reference cell sample for the same respective fluorescent signal.

6. The method of any of embodiments 1-5, wherein the test cell sample, and each of the plurality of the first and second reference cell sample, are from the same source type of cells.

7. The method of any of embodiments 1-6, wherein the source type of cells is a cell line.

8. The method of any of embodiments 1-6, wherein the source type of cells is a primary cell population from a subject.

9. The method of embodiment 8, wherein the source type of cells of each of the test cell sample, and each of the plurality of the first and second reference cell sample, are from a different subject.

10. The method of embodiment 9, wherein each different subject has the same or similar disease or condition.

11. The method of any of embodiments 1-10, wherein the source type of cells is a whole blood sample, an apheresis sample or, a leukapheresis sample.

12. The method of any of embodiments 1-11, wherein the source type of cells is an enriched population of cells, optionally an enriched population of T cells.

13. The method of any of embodiments 1-12, wherein the source type of cells is an engineered population of cells comprising a nucleic acid encoding a recombinant protein, optionally wherein the recombinant protein has been introduced into the population of cells by gene transfer, optionally transduction.

14. The method of any of embodiments 1-13, wherein the source type of cells is a cell therapy.

15. The method of any of embodiments 1-14, wherein the plurality of the first reference cell sample comprise greater than, 2, 5, 10, 25, 50, 100, 200, 300, 400, 500, 600, 700, 800, 900, or 1000 cell samples.

16. The method of any of embodiments 1-15, wherein the plurality of the second reference cell sample comprise greater than, 2, 5, 10, 25, 50, 100, 200, 300, 400, 500, 600, 700, 800, 900, or 1000 cell samples.

17. The method of any of embodiments 1-16, wherein each of the plurality of the first and second reference cell sample is a source type of cells from a subject having a disease or condition in a clinical trial.

18. The method of any of embodiments 1-16, wherein the source type of cells is an autologous cell therapy, and each of the first and second reference cell sample is a sample of the cell therapy from a subject in a clinical trial for testing the cell therapy.

19. The method of embodiment 14 or embodiment 18, wherein the cell therapy is a T cell therapy, optionally a CAR-T cell therapy, TCR-T cell therapy or a TIL therapy.

20. The method of embodiment 14 or embodiment 18, wherein the cell therapy is an NK cell therapy.

21. The method of embodiment 14 or embodiment 18, wherein the cell therapy is a stem cell therapy.

22. The method of any of embodiments 1-21, wherein the test cell sample and each of the second reference cell sample have been subjected to cell staining with one or more staining reagents for labeling the cell with the one or more fluorescent signal.

23. The method of embodiment 22, wherein the one or more staining reagent comprises a binding agent specific to a marker and a fluorescent dye able to emit one of the one or more fluorescent signal.

24. The method of embodiment 23, wherein the marker is a cell surface marker or a viability marker.

25. The method of embodiment 23 or embodiment 24, wherein at least one marker is a prevalent attribute expressed or suspected of being expressed on at least 5% or more of cells in the sample.

26. The method of embodiment 23 or embodiment 24, wherein at least one marker is a low prevalence attribute expressed or suspected of being expressed on less than 5% of cells in the sample.

27. The method of any of embodiments 1-26, wherein the one or more fluorescent signals comprises two or more different fluorescent signals.

28. The method of any of embodiments 22-27, wherein the cell staining is a multi-color cell staining for labeling the cells with two or more different fluorescent signals, wherein each staining reagent labels a different marker with a different fluorescent signal.

29. The method of embodiment 27 or embodiment 28, wherein the two or more different fluorescent signals comprise 2 to 10 fluorescent signals, optionally at or about 2, 3, 4, 5 or 6 fluorescent signals.

30. The method of any of embodiments 27-29, wherein each of the two or more different fluorescent signals has a different emission spectra and/or wherein the peak emission spectra of each fluorescent signal do not overlap.

31. The method of any of embodiments 27-30, wherein the two or more different fluorescent signals is a signal emitted by a dye selected from the group consisting of PE-Cy7, APC, AF700, BV421, Aqua, and BV605.

32. The method of any of embodiments 22-31, wherein the cell staining of the test cell sample and each of the second reference cell sample is carried out with the same staining reagents and using the same protocol conditions.

33. The method of any of embodiments 1-32, wherein the plurality of second reference cell samples comprise duplicate samples of the same stained cells.

34. The method of any of embodiments 1-32, wherein the plurality of second reference cell samples comprise triplicate samples of the same stained cells.

35. The method of any of embodiments 1-34, wherein the static fluorescence threshold gate for at least one fluorescent signal is a fluorescence that is greater than the $95^{th}$ percentile of fluorescence among the plurality of the first reference cell sample for the fluorescent signal.

36. The method of any of embodiments 1-34, wherein the static fluorescence threshold gate for at least one of the one or more fluorescent signal is a fluorescence that is greater than the $97^{th}$ percentile of fluorescence among the plurality of the first reference cell sample for the fluorescent signal.

37. The method of any of embodiments 1-34, wherein the static fluorescence threshold gate for at least one of the one or more fluorescent signal is a fluorescence that is greater than the $99^{th}$ percentile of fluorescence among the plurality of the first reference cell sample for the fluorescent signal.

38. The method of any of embodiments 1-37, wherein the static fluorescence threshold gate for at least one of the one or more fluorescent signal is a fluorescence that is less than the 5th percentile of fluorescence among the plurality of the second reference cell sample for the fluorescent signal.

39. The method of any of embodiments 1-37, wherein the static fluorescence threshold gate for at least one of the one or more fluorescent signal is a fluorescence that is less than the 3rd percentile of fluorescence among the plurality of the second reference cell sample for the fluorescent signal.

40. The method of any of embodiments 1-37, wherein the static fluorescence threshold gate for at least one of the one or more fluorescent signal is a fluorescence that is less than the 1st percentile of fluorescence among the plurality of the second reference cell sample for the fluorescent signal.

41. The method of any one of embodiments 1-37 and 40, wherein, when the fluorescence of a population of unstained cells and the population of stained cells for a fluorescent signal differs by more than 2-fold, the setting the static fluorescence is less than the $1^{st}$ percentile of fluorescence or less than all percentiles of fluorescence among the plurality of the second reference cell sample for the fluorescent signal.

42. The method of any one of embodiments 1-37 and 40, wherein, when the fluorescence of a population of unstained cells and the population of stained cells for a fluorescent signal differs by more than 5-fold, the setting the static fluorescence is less than the $1^{st}$ percentile of fluorescence or less than all percentiles of fluorescence among the plurality of the second reference cell sample for the fluorescent signal.

43. The method of any one of embodiments 1-37 and 40, wherein, when the fluorescence of a population of unstained cells and the population of stained cells for a fluorescent signal differs by more than 10-fold, the setting the static fluorescence is less than the $1^{st}$ percentile of fluorescence or less than all percentiles of fluorescence among the plurality of the second reference cell sample for the fluorescent signal.

44. The method of any one of embodiments 1-43, wherein for a low prevalence attribute, the setting the static fluorescence threshold gate further comprises identifying mean fluorescence intensity (MFI) for one or more of the one or more fluorescent signals.

45. The method of any one of embodiments 1-44, wherein, for each of the one or more fluorescent signals, the static fluorescence threshold gate is an even number on a logarithmic flow axis.

46. The method of any one of embodiments 1-45, wherein, for each of the one or more fluorescent signals, the static fluorescence threshold gate is rounded to the nearest 10, is rounded to the nearest 100, or is rounded to the nearest 1,000, on a logarithmic flow axis.

47. The method of any one of embodiments 2, 3 and 6-46, wherein the method further comprises identifying a subset of cells from the test population of cells that have a fluorescence signal above the static threshold gate for at least two of the one or more fluorescent signals, at least three of the one or more fluorescent signals, at least four of the one or more fluorescent signals, at least five of the one or more fluorescent signals, at least six of the one or more fluorescent signals, or at least seven or more of the one or more fluorescent signals.

48. The method of any one of embodiments 2, 3 and 6-47, wherein the method further comprises identifying a subset of cells from the test population of cells that have a fluorescence signal above the static threshold gate for all of the one or more fluorescent signals.

49. The method of any one of embodiments 1-47, wherein the static fluorescence threshold gate includes at least 91%, at least 92%, at least 93%, at least 94%, at least 95%, at least 96%, at least 97%, at least 98%, or at least 99% of the population of stained cells of the test sample.

50. The method of any one of embodiments 1-49, wherein the setting a static fluorescence threshold gate for each of the one or more fluorescent signals is set such that it includes at least 95%, at least 96%, at least 97%, at least 98%, or at least 99% of the population of stained cells of the test sample.

51. The method of any of embodiments 2, 3 and 6-50, wherein, for the identified subset of cytometric events for at least one of the one or more fluorescent signal, the method further comprises assessing the fluorescence intensity of the at least one fluorescent signal of the identified subset of cytometric events.

52. The method of any of embodiments 2, 3 and 6-50, wherein, for each of the identified subset of cytometric events for each of the one or more fluorescent signal, the method further comprises assessing the intensity of the fluorescent signal of the identified subset of cytometric events.

53. The method of embodiment 51 or embodiment 52, wherein the fluorescence intensity is the mean fluorescence intensity.

54. The method of any of embodiments 2, 3 and 6-53, wherein, for the identified subset of cytometric events for at least one of the one or more fluorescent signal, the method further comprises determining the percentage of the identified subset of cytometric events compared to the total number of collected cytometric events.

55. The method of any of embodiments 2, 3 and 6-53, wherein, for each of the identified subset of cytometric events for each of the one or more fluorescent signal, the method further comprises determining the percentage of the identified subset of cytometric events for the respective fluorescent signal compared to the total number of collected cytometric events.

56. The method of any of embodiments 1-55, wherein the method comprises calibration of the one or more fluorescent signals by the flow cytometer.

57. The method of embodiment 56, wherein the calibration is carried out at least once daily.

V. EXAMPLES

The following examples are included for illustrative purposes only and are not intended to limit the scope of the invention.

Example 1: Development of Static Gating Thresholds for Flow Cytometry Analysis Fluorescence Minus One (FMO) or isotype gating controls for each fluorochrome-conjugated antibody are industry standard gating controls for flow cytometry methods used in Quality Control (QC) settings. Although a benefit to these gating approaches is that they allow for objective gate placement, there are also disadvantages to these approaches, including decreased throughput, increased assay complexity (e.g., due to time limitations, failure rates, and sample volume limitations), and increased cost of goods. A static gating threshold for flow cytometry analysis was developed to address these disadvantages.

Fluorescent thresholds were determined for six attributes using flow cytometry (Table E1). 344 clinical lots of samples were used. Each clinical sample was derived from a manufactured lot of drug product containing CAR T cells. Negative staining analysis was performed from singlets on unstained samples, and positive staining analysis was performed from triplicates on stained samples (Table E1).

TABLE E1

| Attribute # | Fluorophore | Channel | Negative Staining Analysis Sample Size (n) | Positive Staining Analysis Sample Size (n) |
|---|---|---|---|---|
| 1 | PE-Cy7 | B780 | 344 | 1,032 |
| 2 | APC | R670 | 177 | 531 |
| 3 | AF700 | R730 | 344 | 1,032 |
| 4 | BV421 | V450 | 344 | 45 |
| 5 | Aqua | V525 | 156 | 156 |
| 6 | BV605 | V610 | 167 | 501 |

Flowjo analysis software (v10.6) was used to characterize fluorescence expression. Analysis of the unstained samples was used to characterize the upper boundaries of the unstained or negative fluorescence for each attribute. For the unstained or negative samples, this included determining the $99^{th}$ percentile of fluorescence, which was considered the maximum upper boundary of unstained or negative fluorescence; determining the 95th percentile of fluorescence, which was considered the secondary upper boundary of unstained or negative fluorescence; and, in some instances, determining the mean fluorescence intensity (MFI) (FIG. 1B, left).

Analysis of the positive stained replicates was used to characterize the lower boundaries of positive fluorescence for each attribute. For the positive stained samples, this included determining the 1st percentile of fluorescence, which was considered the minimum lower boundary of stained fluorescence; determining the 5th percentile of fluorescence, which was considered the secondary lower boundary of stained fluorescence; and, in some instances, determining the MFI (FIG. 1B, right).

MFI was used to identify the center or densest part of the cell populations, which can be particularly helpful when analyzing low prevalence attributes, where reliance on percentiles of fluorescence alone could be skewed by, e.g., outliers in a cell population that has a relatively low number of cells exhibiting fluorescence (in either the positive or negative staining cell population). The center of the negative staining cell populations and the positive staining cell populations were determined based on MFI, and the edges of the cell populations were then determined by identifying the $99^{th}$ and/or $95^{th}$ percentile of fluorescence for the negative staining cell populations, or by identifying the $1^{st}$ and/or $5^{th}$ percentile of fluorescence for the positive staining cell populations. This allowed for setting a threshold to separate the negative staining cell population from the positive staining cell population. MFI analysis was not necessary when analyzing dense and robust populations of cells, e.g., high prevalence attributes, whereas MFI analysis was used as an additional way to characterize the fluorescence properties of sparse populations of cells, e.g., low prevalence attributes.

FIGS. 2A and 2B show an example of a negative or unstained analysis (FIG. 2A) and a positive stained analysis (FIG. 2B) for a representative attribute using the AF700 fluorophore. As shown in FIG. 2A, the maximum of the $95^{th}$ percentile for the unstained or negative fluorescence had a relative fluorescence intensity of 62.9, and the maximum of the $99^{th}$ percentile for the unstained or negative fluorescence had a relative fluorescence intensity of 173.00. As shown in FIG. 2B, the 1st percentile of fluorescence for the positive stained samples had a relative fluorescence intensity of 3,597.0, and the $5^{th}$ percentile of fluorescence for the positive stained samples had a relative fluorescence intensity of 5,324.0. Based on this data, the static fluorescence threshold for this attribute was set at 3,000.

Fluorescent thresholds for each attribute were then established that distinguished positive staining from unstained or negative staining.

For prevalent attributes (≥5% frequency in samples), sometimes referred to as high prevalence attributes, the fluorescent threshold was established by (1) excluding the unstained or negative population by setting the fluorescence threshold above the maximum of the $99^{th}$ percentile for the unstained or negative population, (2) including as much of the positive population as possible, while excluding statistical outliers, (3) placing the threshold conservatively on the positive population when there was a wide range between positive and negative or unstained fluorescence, and (3) rounding the threshold to an even number on a logarithmic flow axis, in order to optimize workflow. By applying this criteria to the prevalent attribute with analyses shown in FIGS. 2A and 2B, the fluorescent threshold was established to be 3,000. To include as much of the positive population as possible, while excluding statistical outliers, the fluorescence threshold was set below the minimum $5^{th}$ percentile for the positive population for each attribute, whenever possible, which was done for each of the prevalent attributes analyzed.

For low prevalence attributes (≤5% frequency in samples), the fluorescent threshold was established by (1) excluding the unstained or negative population by setting the fluorescence threshold above the maximum of the $99^{th}$ percentile for the unstained or negative population, (2) including as much of the positive population as possible, while excluding statistical outliers, (3) using MFI analyses to aid in threshold determination, and (3) rounding the threshold to an even number on a logarithmic flow axis, in order to optimize workflow. To include as much of the positive population as possible, while excluding statistical outliers, the fluorescence threshold was set below the minimum $5^{th}$ percentile for the positive population for each attribute, whenever possible. The dye for attribute 5 (Aqua, as shown in Table E2 below) had high levels of background, so the minimum $5^{th}$ percentile value of 1506.3 was rounded up to the nearest whole scale marker of 2000 in order to preferentially include the positive population over the unstained or negative population.

MFI analysis involved characterizing the unstained or negative population and the positive population to identify the mean fluorescence intensity or $50^{th}$ percentile of intensity, which is typically where the middle and most dense part of a population is on the fluorescence scale. The MFI analysis was then used to aid in determining the fluorescence thresholds/boundaries of each attribute.

Table E2, below, summarizes the unstained or negative staining analysis and positive staining analysis for each of the six reportable attributes, and provides the fluorescent threshold that was established for each attribute. Attributes 1-3 and 6 are prevalent attributes, and attributes 4 and 5 are low prevalent attributes.

TABLE E2

| Attribute # | Fluoro-phore | Channel | Negative Staining Analysis | | Positive Staining Analysis | | Fluores-cence |
| | | | Max 95th | Max 99th | Min 1st | Min 5th | Thresh-old |
|---|---|---|---|---|---|---|---|
| 1 | PE-Cy7 | B780 | 43.6 | 62.9 | 68.1 | 474.0 | 200 |
| 2 | APC | R670 | 109.0 | 153.0 | 868.0 | 1506.0 | 900 |
| 3 | AF700 | R730 | 62.9 | 173.0 | 3597.0 | 5324.0 | 3000 |
| 4 | BV421 | V450 | 120.0 | 215.0 | 459.7 | 732.8 | 450 |
| 5 | Aqua | V525 | 487.0 | 995.6 | 1389.0 | 1506.3 | 2000 |
| 6 | BV605 | V610 | 96.5 | 138.0 | 60.4 | 221.0 | 200 |

The fluorescence threshold for low prevalence attributes 4 and 5 were determined, in part, by MFI due to skewing of the 1st percentile and $5^{th}$ percentile values in the positive staining analysis.

Figure 3:
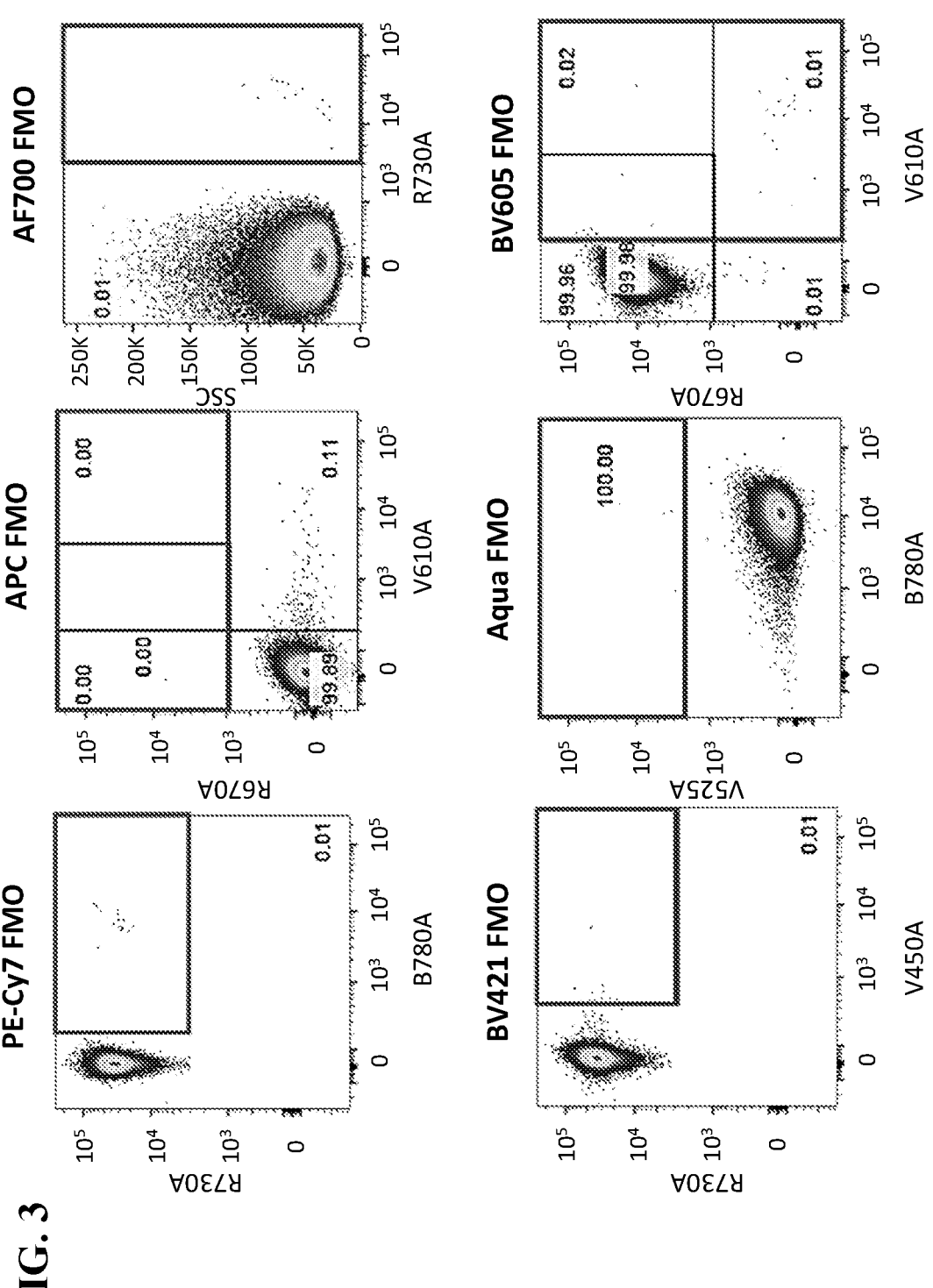
FIG. 3 depicts the application of static fluorescent gating thresholds to fluorescence minus one (FMO) gating controls for each of the six tested attributes.

To determine whether the static fluorescence threshold gates were equivalent with current cluster gating practices, the fluorescence threshold for prevalent attributes, including attributes 1, 2, and 6, was used to analyze the FMO control for each attribute. An FMO gated attribute, which was not threshold gated, was included in this assessment to determine if upstream gating changes with fluorescent thresholds impacted the reportable value. Table E3 summarizes the results from the comparative analysis. The static fluorescence threshold gate for each of the prevalent attributes was below the frequencies used to place FMO-guided gates (FIG. 3; Table E3). As shown in Table E3, the static fluorescence threshold gates for attributes 1, 2, and 6 were shown to be equivalent to the current gating method using FMO analysis. This demonstrates that static fluorescence threshold gating appropriately excludes background fluorescence when applied to FMO samples, with reportables being equivalent to the current gating method of FMO analysis.

TABLE E3

| Attribute # | Sample Size | Range (Reportable Percentage) | Acceptance Criteria | Result (Upper CI, Lower CI) | Conclusion |
|---|---|---|---|---|---|
| FMO gated attribute | 97 | 14.5-89.7% | 1.55 SD | −0.31 (−0.42, −0.20) | Equivalent |
| 1 | 97 | 98.6-100% | 1.55 SD | −0.02 (−0.04, 0.00) | Equivalent |
| 2 | 49 | 29.5-99.9% | 1.55 SD | 0.02 (−0.01, 0.05) | Equivalent |
| 6 | 48 | 93.5-99.9% | 1.55 SD | 0.18 (0.11, 0.24) | Equivalent |

To evaluate the precision of static fluorescence threshold gating, precision based on the percentage (%) coefficient of variation (CV) between operators was evaluated across three operators on 97 patient sample lots for four prevalent attributes (attributes 1-3 and 6).

As shown in Table E4, static fluorescence threshold gating was precise from operator-to-operator, with less than 3% CV observed for all attributes evaluated.

TABLE E4

| Attribute # | Fluorophore | Channel | Sample Size (n) | Maximum Imprecision |
|---|---|---|---|---|
| FMO gated attribute | PE-Cy7 | B780 | 97 | 2.95% |
| 1 | APC | R670 | 97 | 0.03% |
| 2 | AF700 | R730 | 49 | 0.09% |
| 6 | BV605 | V610 | 48 | 0.03% |

Lin's concordance correlation test was used to characterize the correlation between the static fluorescence threshold gating reportables and reportable attributes. Concordance Correlation results are detailed below in Table E5.

TABLE E5

| Attribute # | Sample Size (n) | Results (Upper CI, Lower CI) |
|---|---|---|
| FMO Gated Attribute | 97 | 0.999 (0.,998, 0.999) |
| 1 | 97 | N/A - no linear pattern to evaluate |
| 2 | 49 | 1.00 (1.00, 1.00) |
| 6 | 48 | 0.963 (0.943, 0.977) |

To evaluate background fluorescence using static fluorescence threshold gating applied to FMO samples, the static fluorescence threshold gating was applied to three development samples, each of which had an FMO sample that was stained using each of the same six attributes, and was then analyzed using the appropriate fluorescent channels. Background percentage was reported as a percent of the parent population. The maximum acceptable background for the FMO evaluation was 1.0% of the parent population for all populations except for population 4, which had a maximum acceptable background of 0.2%, as previously determined (data not provided). The FMO comparison results showing the maximum background for each population is provided in Table E6, below. As shown in Table E6, the maximum background for each population was acceptable since they were well below the maximum acceptable background percentage of 1%. This demonstrates that the static fluorescence threshold gate for each of the six attributes was effective at excluding background staining.

TABLE E6

| Population | Maximum Background in FMO Samples (n = 3) | Conclusion |
|---|---|---|
| 1 | 0.07% | Acceptable |
| 3 | 0.00% | Acceptable |
| 2 | 0.01% | Acceptable |
| 4 | 0.01% | Acceptable |
| 5 | 0.00% | Acceptable |
| 6 | 0.06% | Acceptable |

The present invention is not intended to be limited in scope to the particular disclosed embodiments, which are provided, for example, to illustrate various aspects of the invention. Various modifications to the compositions and methods described will become apparent from the description and teachings herein. Such variations may be practiced without departing from the true scope and spirit of the disclosure and are intended to fall within the scope of the present disclosure.

The invention claimed is:

1. A method of determining a static fluorescence threshold gate, the method comprising:

(1) measuring cytometry events by flow cytometry for one or more fluorescent signals for a plurality of at least two reference cell samples, the plurality of the at least two reference cell samples comprising:

(a) a plurality of a first reference cell sample each comprising a population of unstained cells that have not been labeled with the one or more fluorescent signals; and (b) a plurality of a second reference cell sample, wherein each of the plurality of the second reference cell sample is derived from the same source type of cells as one of the plurality of the first reference cell sample, and wherein each of the plurality of the second reference cell sample comprises at least one population of stained cells that have been labeled with at least one of the one or more fluorescent signals; and (2) setting a static fluorescence threshold gate for each of the one or more fluorescent signals, such that for each fluorescent signal the threshold gate is a fluorescence that:

(a) is greater than the $90^{th}$ percentile of fluorescence of the plurality of the first reference cell sample for the respective fluorescent signal of each of the one or more fluorescent signals; and (b) is less than the $10^{th}$ percentile of fluorescence of the plurality of the second reference cell sample for the same respective fluorescent signal.

2. A method of selecting a subset of cytometry events from flow cytometry data, the method comprising:

(1) receiving flow cytometry data comprising a plurality of cytometry events from a test cell sample comprising labeled cells sorted according to one or more fluorescent signals measured by a flow cytometer;

(2) applying a static fluorescence threshold gate individually to each of the one or more fluorescent signals, wherein the static fluorescence threshold gate for each of the one or more fluorescent signals is determined according to the method of claim 1; and (3) for each of the one or more fluorescent signals, identifying a subset of cytometry events from the test sample that have a fluorescence signal above the static threshold gate.

3. A method of selecting a subset of cytometry events from flow cytometry data, comprising:

(1) receiving flow cytometry data comprising a plurality of cytometry events from a test cell sample comprising labeled cells sorted according to one or more fluorescent signals measured by a flow cytometer;

(2) applying a static fluorescence threshold gate individually to each of the one or more fluorescent signals, wherein the static fluorescence threshold gate for each of the one or more fluorescent signals is determined from:

(a) cytometry events measured by flow cytometry for the one or more fluorescent signals for a plurality of at least two reference cell samples each sorted according to the one or more fluorescent signals, the plurality of the at least two reference cell samples comprising:

(i) a plurality of a first reference cell sample each comprising a population of unstained cells that have not been labeled with the one or more fluorescent signals; and (ii) a plurality of a second reference cell sample, wherein each of the plurality of the second reference cell sample is derived from the same source type of cells as one of the plurality of the first reference cell sample, and wherein each of the plurality of the second reference cell sample comprises at least one population of stained cells that have been labeled with at least one of the one or more fluorescent signals; and (b) setting a static fluorescence threshold gate for each of the one or more fluorescent signals such that for each fluorescent signal the threshold gate is a fluorescence that:

(i) is greater than the $90^{th}$ percentile of fluorescence of the plurality of the first reference cell sample for the respective fluorescent signal of each of the one or more fluorescent signals; and (ii) is less than the $10^{th}$ percentile of fluorescence of the plurality of the second reference cell sample for the same respective fluorescent signal; and (3) for each of the one or more fluorescent signals, identifying a subset of cytometry events from the test cell sample that have a fluorescence signal above the static threshold gate.

4. A method of applying a static fluorescence threshold gate using flow cytometry, comprising:

(1) receiving flow cytometry data comprising a plurality of cytometry events from a test cell sample comprising labeled cells sorted according to one or more fluorescent signals measured by a flow cytometer; and (2) applying a static fluorescence threshold gate individually to each of the one or more fluorescent signals, wherein the static fluorescence threshold gate for each of the one or more fluorescent signals is determined according to the method of claim 1.

5. A method of applying a static fluorescence threshold gate using flow cytometry, comprising:

(1) receiving flow cytometry data comprising a plurality of cytometry events from a test cell sample comprising labeled cells sorted according to one or more fluorescent signals measured by a flow cytometer;

(2) applying a static fluorescence threshold gate individually to each of the one or more fluorescent signals, wherein the static fluorescence threshold gate for each of the one or more fluorescent signals is determined from:

(a) cytometry events measured by flow cytometry for the one or more fluorescent signals for a plurality of at least two reference cell samples each sorted according to the one or more fluorescent signals, the plurality of the at least two reference cell samples comprising:

(i) a plurality of a first reference cell sample each comprising a population of unstained cells that have not been labeled with the one or more fluorescent signals; and (ii) a plurality of a second reference cell sample, wherein each of the plurality of the second reference cell sample is derived from the same source type of cells as one of the plurality of the first reference cell sample, and wherein each of the plurality of the second reference cell sample comprises at least one population of stained cells that have been labeled with at least one of the one or more fluorescent signals; and (b) setting a static fluorescence threshold gate for each of the one or more fluorescent signals, such that for each fluorescent signal the threshold gate is a fluorescence that:

(i) is greater than the $90^{th}$ percentile of fluorescence of the plurality of the first reference cell sample for the respective fluorescent signal of each of the one or more fluorescent signals; and (ii) is less than the $10^{th}$ percentile of fluorescence of the plurality of the second reference cell sample for the same respective fluorescent signal.

6. The method of claim 2, wherein the test cell sample, and each of the plurality of the first and second reference cell sample, are from the same source type of cells.

7. The method of claim 1, wherein the source type of cells is a cell line.

8. The method of claim 1, wherein the source type of cells is a primary cell population from a subject.

9. The method of claim 2, wherein the source type of cells of each of the test cell sample, and each of the plurality of the first and second reference cell sample, are from a different subject.

10. The method of claim 9, wherein each different subject has the same or similar disease or condition.

11. The method of claim 1, wherein the source type of cells is a whole blood sample, an apheresis sample, or a leukapheresis sample.

12. The method of claim 1, wherein the source type of cells is an enriched population of cells.

13. The method of claim 1, wherein the source type of cells is an engineered population of cells comprising a nucleic acid encoding a recombinant protein.

14. The method of claim 1, wherein the source type of cells is a cell therapy.

15. The method of claim 1, wherein each of the plurality of the first and second reference cell sample is a source type of cells from a subject having a disease or condition in a clinical trial.

16. The method of claim 14, wherein the source type of cells is an autologous cell therapy, and each of the first and second reference cell sample is a sample of the cell therapy from a subject in a clinical trial for testing the cell therapy.

17. The method of claim 14, wherein the cell therapy is a T cell therapy, wherein the T cell therapy is a CAR-T cell therapy, TCR-T cell therapy, or a TIL therapy.

18. The method of claim 14, wherein the cell therapy is an NK cell therapy.

19. The method of claim 14, wherein the cell therapy is a stem cell therapy.

20. The method of claim 2, wherein the test cell sample and each of the second reference cell sample have been subjected to cell staining with one or more staining reagents for labeling the cells with the one or more fluorescent signals.

21. The method of claim 20, wherein each of the one or more staining reagents comprises a binding agent specific to a marker and a fluorescent dye able to emit one of the one or more fluorescent signals.

22. The method of claim 21, wherein the marker is a cell surface marker or a viability marker.

23. The method of claim 21, wherein at least one marker is a prevalent attribute expressed or suspected of being expressed on at least 5% or more of cells in the test cell sample and each of the second reference cell sample.

24. The method of claim 23, wherein at least one marker is a low prevalence attribute expressed or suspected of being expressed on less than 5% of cells in the test cell sample and each of the second reference cell sample.

25. The method of claim 1, wherein the one or more fluorescent signals comprise two or more different fluorescent signals.

26. The method of claim 20, wherein the cell staining is a multi-color cell staining for labeling the cells with two or more different fluorescent signals, wherein each staining reagent labels a different marker with a different fluorescent signal.

27. The method of claim 25, wherein each of the two or more different fluorescent signals has a different emission spectra and/or wherein the peak emission spectra of each fluorescent signal do not overlap.

28. The method of claim 25, wherein each of the two or more different fluorescent signals is a signal emitted by a dye selected from the group consisting of PE-Cy7, APC, AF700, BV421, Aqua, and BV605.

29. The method of claim 1, wherein the plurality of the second reference cell sample comprises duplicate samples of the same stained cells.

30. The method of claim 1, wherein the static fluorescence threshold gate for at least one of the one or more fluorescent signals is a fluorescence that is greater than the 99th percentile of fluorescence among the plurality of the first reference cell sample for the fluorescent signal.

31. The method of claim 1, wherein the static fluorescence threshold gate for at least one of the one or more fluorescent signals is a fluorescence that is less than the $1^{st}$ percentile of fluorescence among the plurality of the second reference cell sample for the fluorescent signal.

32. The method of claim 1, wherein when the fluorescence of a population of unstained cells and a population of stained cells for a fluorescent signal differs by more than 10-fold, the static fluorescence threshold gate is set at less than the $1^{st}$ percentile of fluorescence or less than all percentiles of fluorescence among the plurality of the second reference cell sample for the fluorescent signal.

33. The method of claim 1, wherein for a low prevalence attribute, the setting of the static fluorescence threshold gate further comprises identifying mean fluorescence intensity (MFI) for one or more of the one or more fluorescent signals.

34. The method of claim 1, wherein for each of the one or more fluorescent signals, the static fluorescence threshold gate is an even number on a logarithmic flow axis, and wherein for each of the one or more fluorescent signals, the static fluorescence threshold gate is rounded to the nearest 10, is rounded to the nearest 100, or is rounded to the nearest 1,000, on a logarithmic flow axis.

35. The method of claim 2, wherein the static fluorescence threshold gate includes at least 91%, at least 92%, at least 93%, at least 94%, at least 95%, at least 96%, at least 97%, at least 98%, or at least 99% of the population of stained cells of the test cell sample, and wherein the static fluorescence threshold gate for each of the one or more fluorescent signals is set such that it includes at least 95%, at least 96%, at least 97%, at least 98%, or at least 99% of the population of stained cells of the test cell sample.

36. The method of claim 2, wherein for each of the identified subset of cytometry events for each of the one or more fluorescent signals, the method further comprises assessing the intensity of the fluorescent signal of the identified subset of cytometry events.

37. The method of claim 36, wherein the fluorescence intensity is the mean fluorescence intensity.

38. The method of claim 2, wherein for the identified subset of cytometry events for at least one of the one or more fluorescent signals, the method further comprises determining the percentage of the identified subset of cytometry events compared to the total number of collected cytometry events.

39. The method of claim 2, wherein for each of the identified subset of cytometry events for each of the one or more fluorescent signals, the method further comprises determining the percentage of the identified subset of cytometry events for the respective fluorescent signal compared to the total number of collected cytometry events.

40. The method of claim 1, wherein the method comprises calibration of the one or more fluorescent signals by the flow cytometer, and wherein the calibration is carried out at least once daily.

* * * * *